United States Patent
Frazier

(10) Patent No.: US 8,402,054 B2
(45) Date of Patent: Mar. 19, 2013

(54) SYSTEMS AND METHODS FOR PRIORITIZING CONTENT BASED ON USER PROFILE RELEVANCE

(75) Inventor: Kristopher T Frazier, Dallas, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 841 days.

(21) Appl. No.: 12/165,489

(22) Filed: Jun. 30, 2008

(65) Prior Publication Data

US 2009/0248602 A1 Oct. 1, 2009

Related U.S. Application Data

(63) Continuation-in-part of application No. 12/059,585, filed on Mar. 31, 2008, now Pat. No. 7,958,139.

(51) Int. Cl.
G06F 7/00 (2006.01)
G06F 17/30 (2006.01)

(52) U.S. Cl. ........................................ 707/780; 707/802

(58) Field of Classification Search ................. 707/805, 707/802, 780
See application file for complete search history.

(56) References Cited

U.S. PATENT DOCUMENTS

| 7,139,757 B1* | 11/2006 | Apollonsky et al. ................ 1/1 |
| 7,672,909 B2* | 3/2010 | Meijer et al. .................... 706/12 |
| 7,716,150 B2* | 5/2010 | Cheng et al. .................... 706/45 |
| 7,720,065 B2* | 5/2010 | Liu et al. ....................... 370/389 |
| 2007/0250467 A1* | 10/2007 | Mesnik et al. .................... 707/1 |
| 2008/0140679 A1* | 6/2008 | Deyo et al. ..................... 707/100 |

* cited by examiner

*Primary Examiner* — Kuen Lu

(57) ABSTRACT

In an exemplary method, a request for content initiated by a user associated with a user profile is received, a plurality of content instances is identified as being related to the requested content based on a predefined relationship heuristic, wherein the content instances are associated with other user profiles, a relevance between the user profile and each of the other user profiles is determined based on a predefined relevance heuristic, and the content instances are prioritized based on the determined relevance. In certain embodiments, data representative of the prioritized content instances is displayed in accordance with the prioritization.

19 Claims, 21 Drawing Sheets

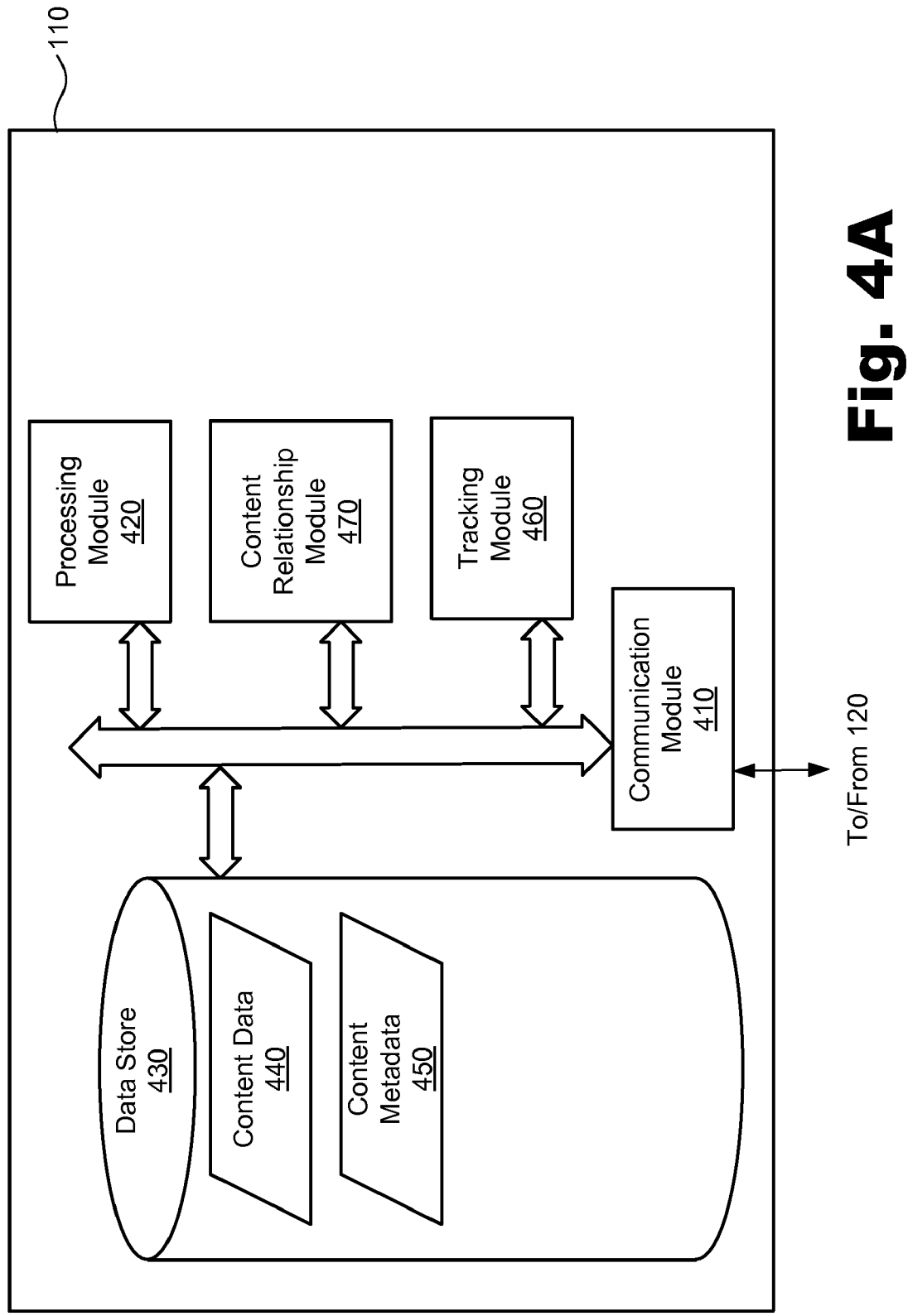

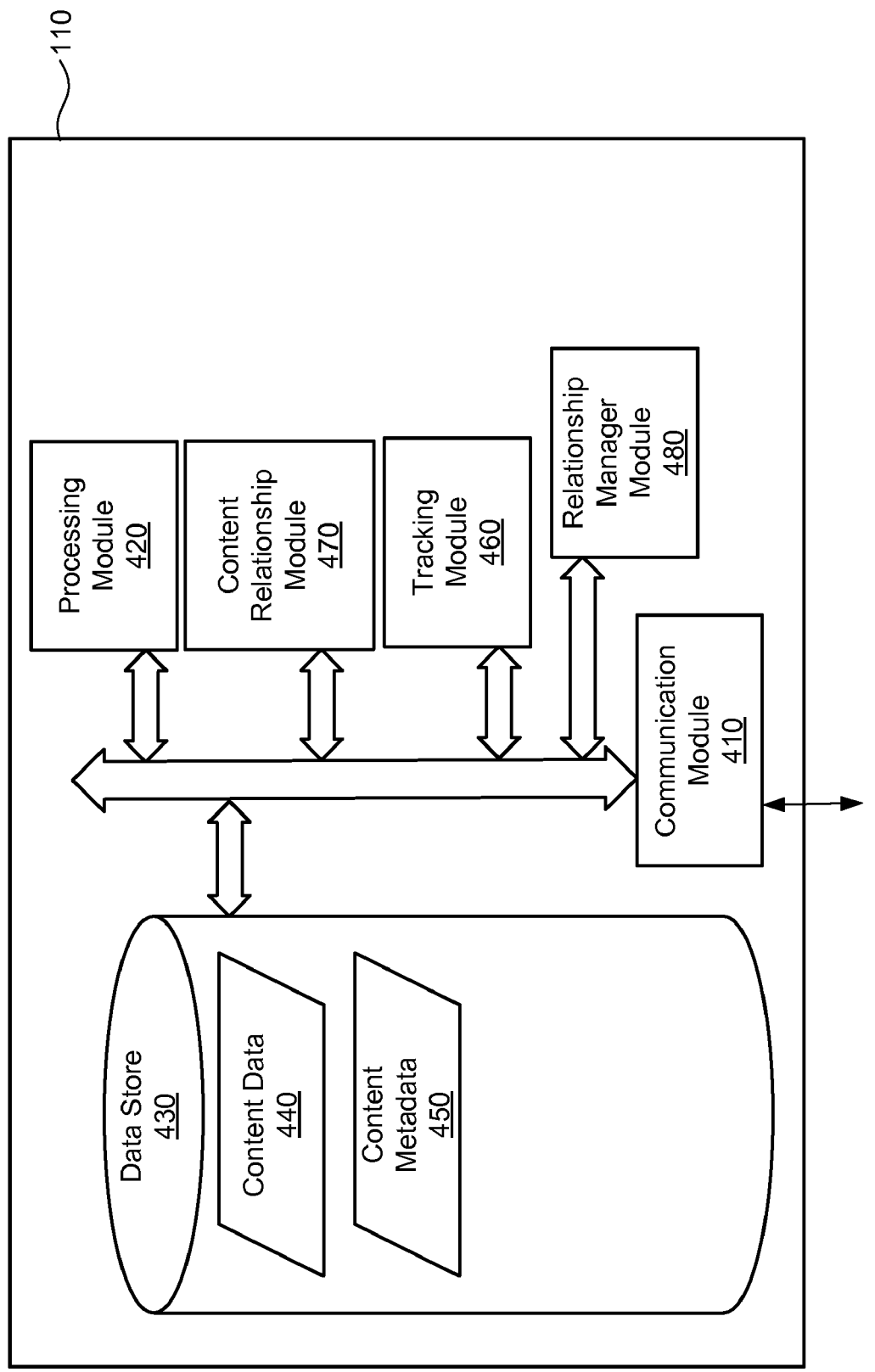

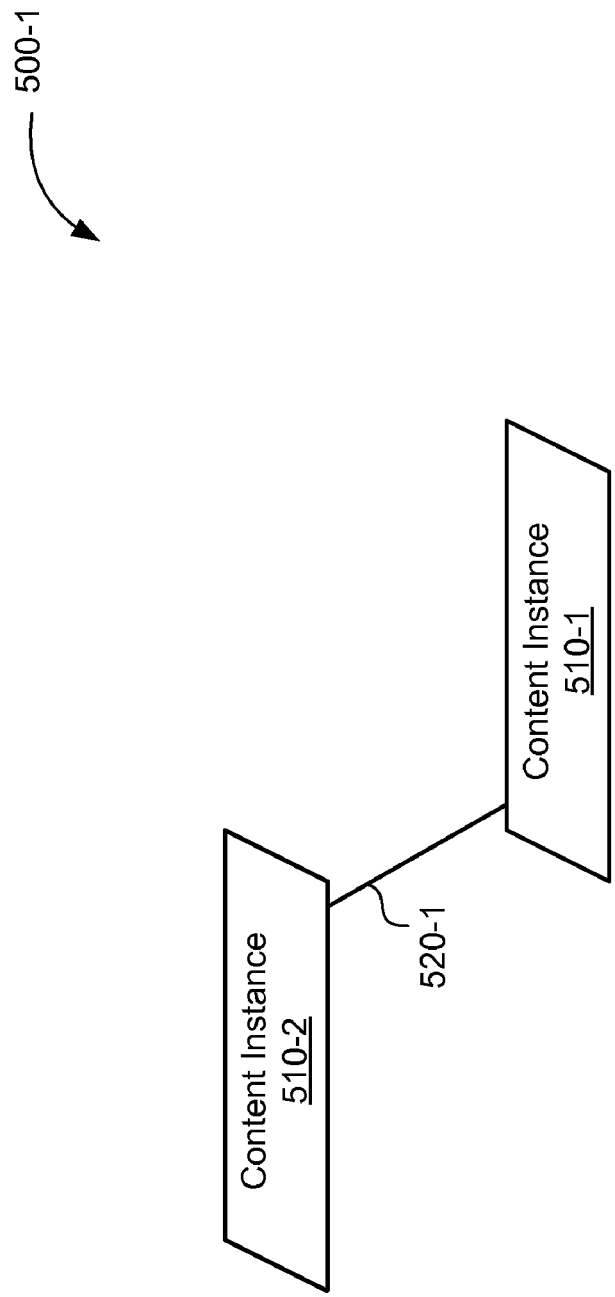

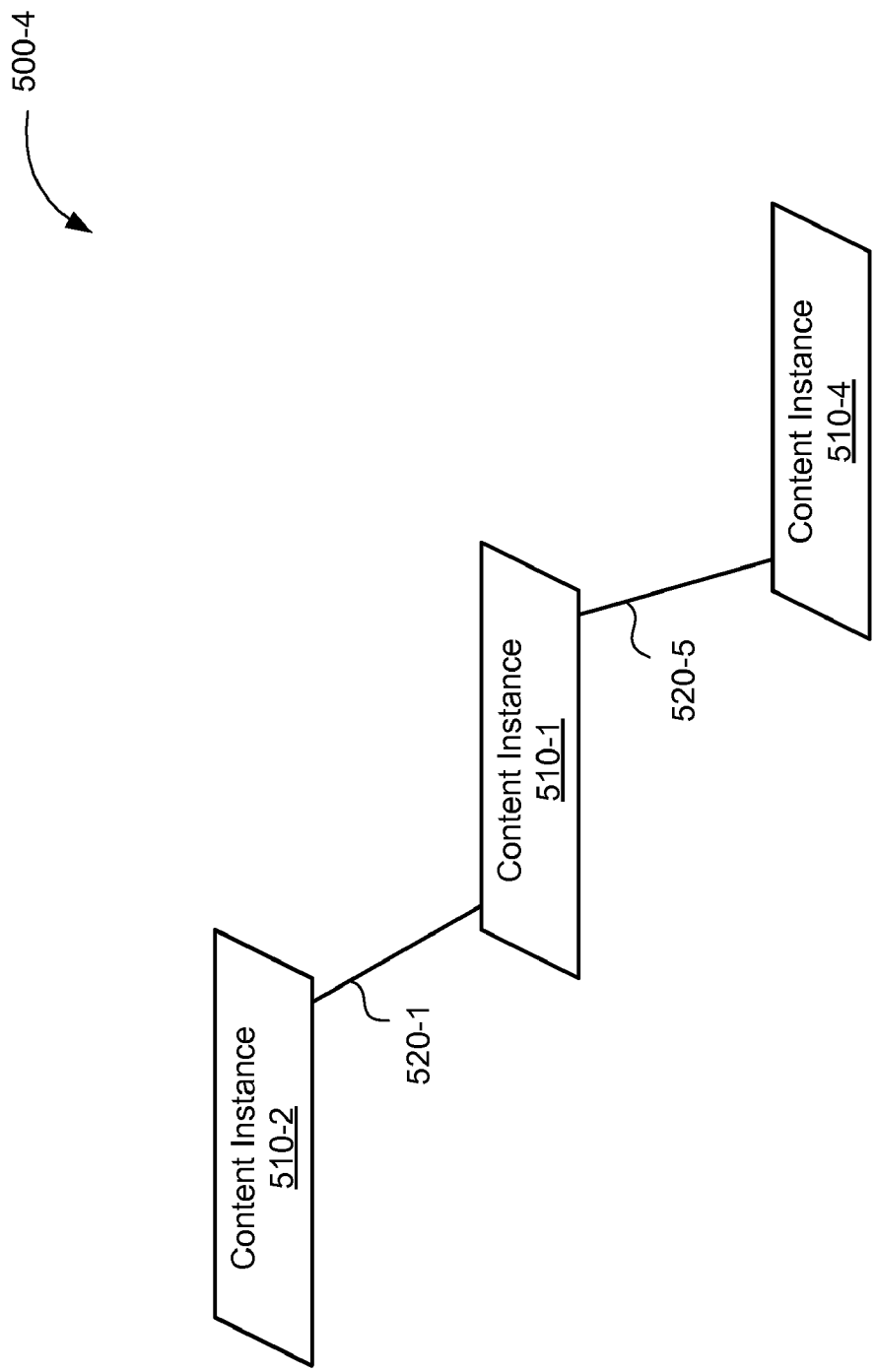

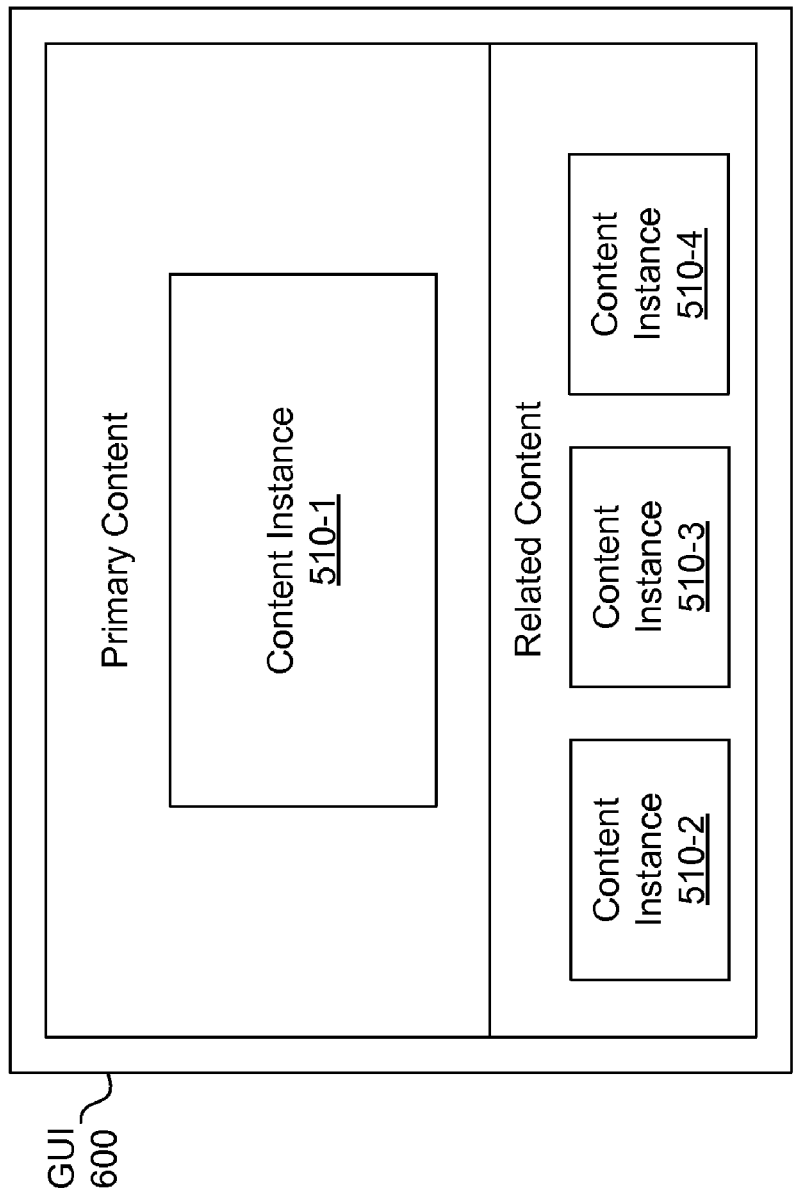

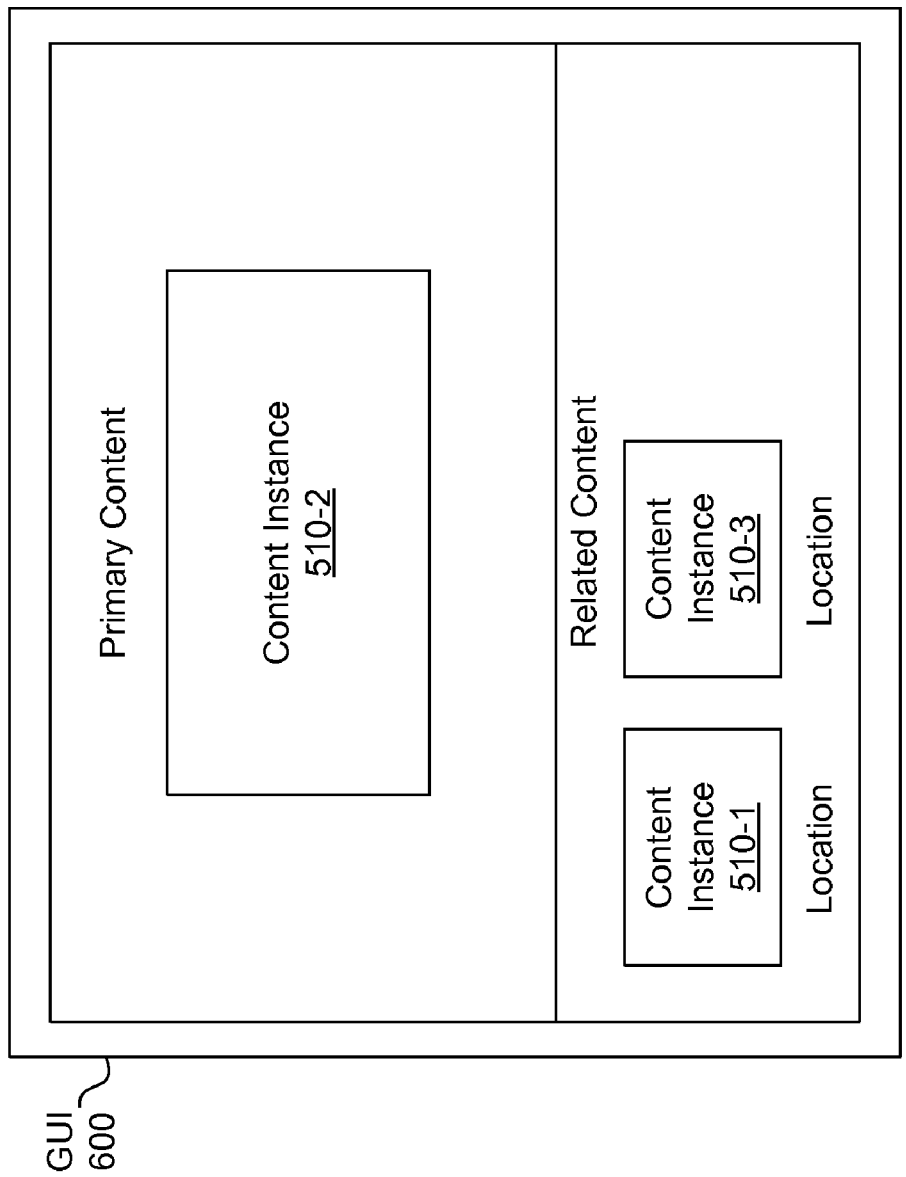

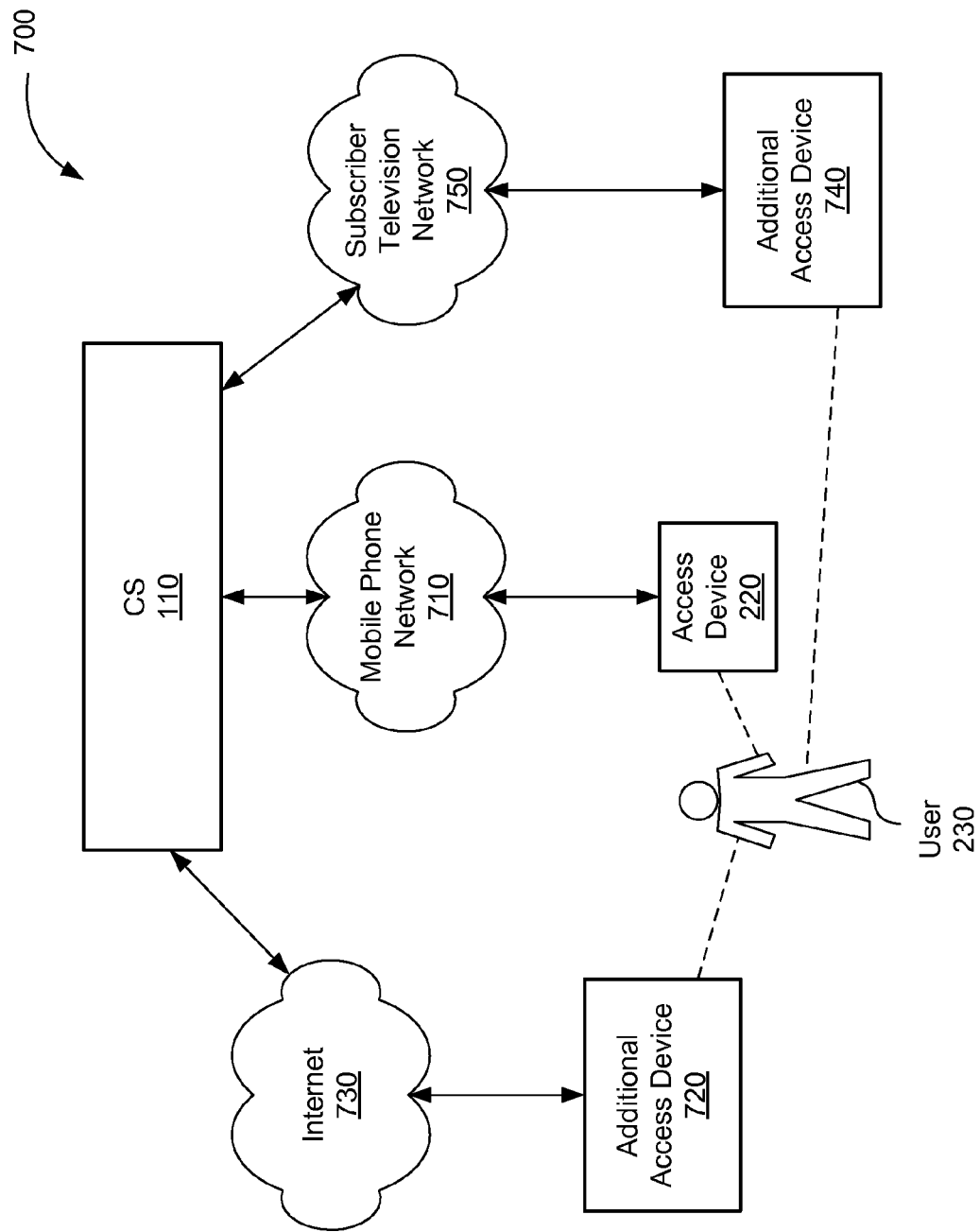

US 8,402,054 B2

SYSTEMS AND METHODS FOR PRIORITIZING CONTENT BASED ON USER PROFILE RELEVANCE

RELATED APPLICATIONS

This application is a continuation-in-part of presently pending U.S. patent application Ser. No. 12/059,585 filed Mar. 31, 2008, entitled RELATED CONTENT STORAGE AND RETRIEVAL SYSTEMS AND METHODS, which is hereby incorporated by reference in its entirety.

BACKGROUND INFORMATION

In computing, a file system is typically configured to translate physical locations on a disk (e.g., a hard drive) to a logical data structure in which electronic files are organized in hierarchical directories. It is not uncommon for such directories to include many hierarchical levels and vast numbers of files. Unless specific information about a particular file or its hierarchical location is known, it can be difficult to locate the electronic file within a conventional hierarchical directory. Difficulties in locating electronic files typically intensify along with an increase in the number of electronic files in a hierarchical directory.

Moreover, with traditional content storage and retrieval technologies, a user who requests content may be inundated with information that is deemed to be related to the requested content. Because of the amount of such information that is returned and/or the difficulty in looking through the information, the user may be overwhelmed by and/or find the information unhelpful.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 4A illustrates exemplary components of a content storage and retrieval subsystem.

FIG. 4B illustrates an exemplary relationship manager module included in the content storage and retrieval subsystem of FIG. 4A.

FIGS. 5A-D illustrate several exemplary virtual content relationship maps.

FIGS. 6A-C illustrate several exemplary views of content displayed in a graphical user interface.

FIG. 7 illustrates another exemplary implementation of the system of FIG. 1.

DETAILED DESCRIPTION OF PREFERRED EMBODIMENTS

Figure 1:
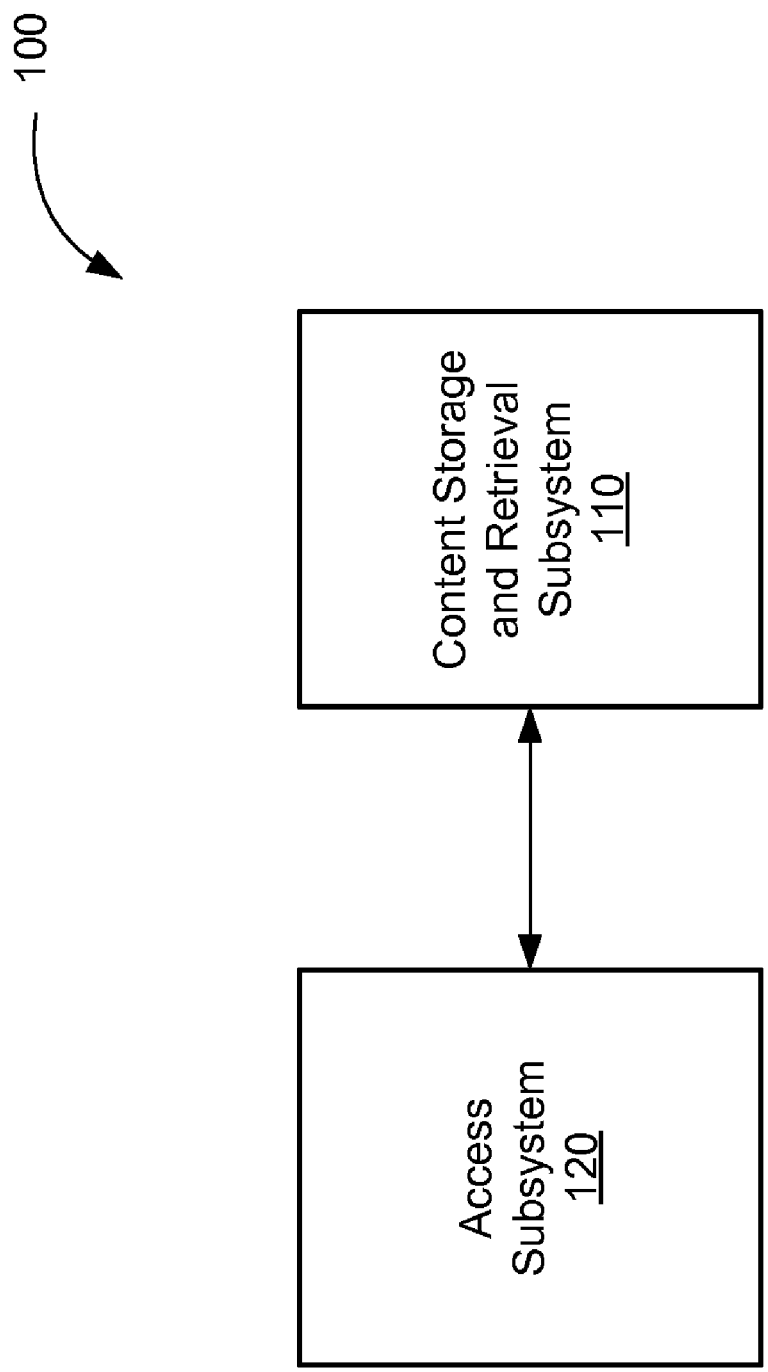
FIG. 1 illustrates an exemplary relative content storage and retrieval system.

Exemplary relative content storage and retrieval systems and methods are described herein. Exemplary systems and methods for prioritizing content based on user profile relevance are also disclosed herein.

In an exemplary method, a request for content initiated by a user associated with a user profile is received, a plurality of content instances is identified as being related to the requested content based on a predefined relationship heuristic, wherein the content instances are associated with other user profiles, a relevance between the user profile and each of the other user profiles is determined based on a predefined relevance heuristic, and the content instances are prioritized based on the determined relevance. In certain embodiments, data representative of the prioritized content instances is displayed in accordance with the prioritization. Examples of determining relevance and prioritizing content in accordance with the determined relevance are described herein.

As used herein, the term "content instance" refers generally to any data record or object (e.g., an electronic file) storing or otherwise associated with content, which may include electronic data representative of text, one or more messages (e.g., short message service ("SMS") messages, electronic mail messages, or multimedia message service ("MMS") messages), one or more symbols, one or more graphics, one or more images (e.g., digital photographs and video frames), video, audio, multimedia, video games, or any segment, component, or combination of these or other forms of electronic data that may be viewed or otherwise experienced by a user.

The term "metadata" as used herein refers generally to any electronic data descriptive of content and/or content instances. For example, metadata may include, but is not limited to, content instance identifiers (e.g., file names), time data, location data, user data, source data, destination data, size data, creation data, modification data, data structure data, and access data descriptive of content and/or one or more content instances. Examples of metadata may include time data associated with a data operation (e.g., creating, modifying, deleting, receiving, or sending content), location data associated with a data operation (e.g., a geographic or network location at which content is created), user data identifying one or more users associated with content (e.g., a user who created, modified, deleted, sent, received, accessed, or otherwise operated on or is owner of content), content type information (e.g., file type or other predefined category of content), content transport information, source data associated with a source of content (e.g., a user from whom content is received), and destination data associated with a destination to which content is sent (e.g., a user to whom content is transmitted).

Exemplary embodiments of relative content storage, retrieval, and user profile relevance based prioritization systems and methods will now be described in more detail with reference to the accompanying drawings.

FIG. 1 illustrates an exemplary content storage and retrieval system 100 (or simply "system 100"). As shown in FIG. 1, system 100 may include a content storage and retrieval subsystem 110 and an access subsystem 120 configured to communicate with one another. Access subsystem 120 and content storage and retrieval subsystem 110 may communicate using any communication platforms and technologies suitable for transporting data representative of content, content metadata, content management commands, and/or other communications, including known communication technologies, devices, media, and protocols supportive of remote or local data communications. Example of such communication technologies, devices, media, and protocols include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), Evolution Data Optimized Protocol ("EVDO"), radio frequency ("RF") signaling technologies, signaling system seven ("SS7") technologies, Ethernet, in-band and out-of-band signaling technologies, and other suitable communications networks and technologies.

In some examples, system 100 may include any computer hardware and/or instructions (e.g., software programs), or combinations of software and hardware, configured to perform the processes described herein. In particular, it should be understood that components of system 100 may be implemented on one physical computing device or may be implemented on more than one physical computing device. Accordingly, system 100 may include any one of a number of well known computing devices, and may employ any of a number of well known computer operating systems, including, but by no means limited to, known versions and/or varieties of Microsoft Windows, UNIX, Macintosh, and Linux operating systems.

Accordingly, the processes described herein may be implemented at least in part as computer-executable instructions, i.e., instructions executable by one or more computing devices, tangibly embodied in a computer-readable medium. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figure 2:
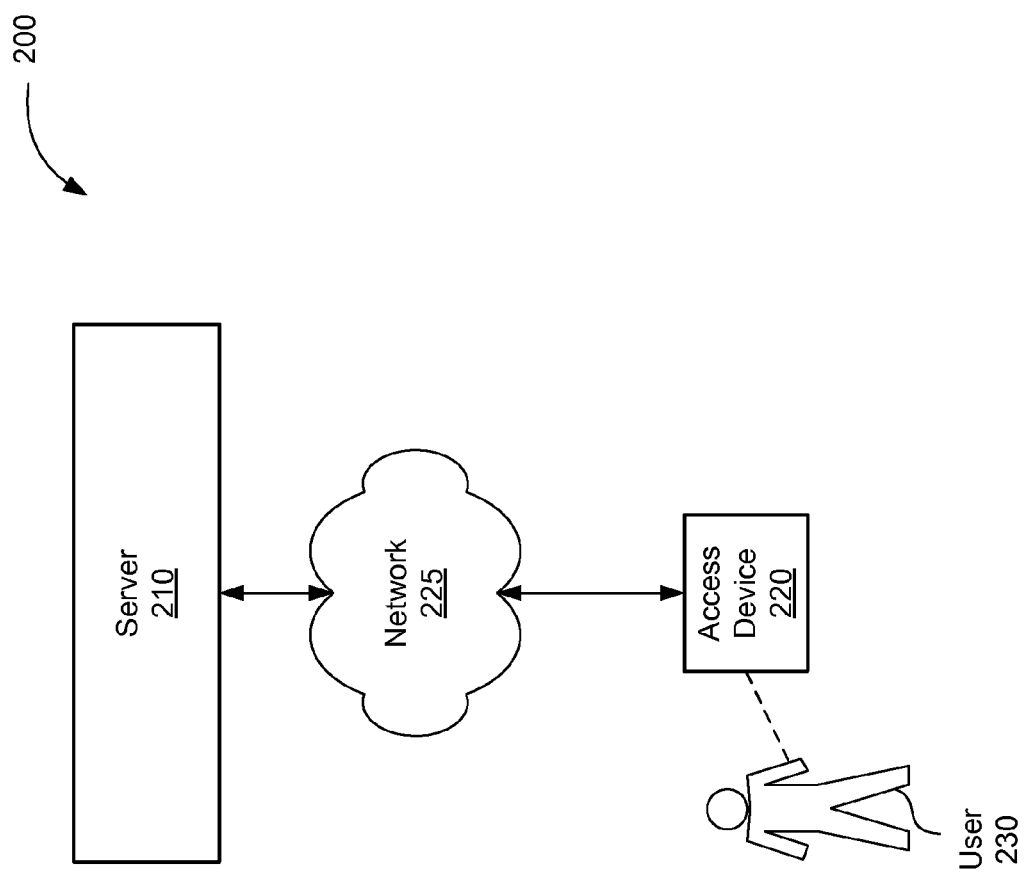
FIG. 2 illustrates an exemplary implementation of the system of FIG. 1.

FIG. 2 illustrates an exemplary implementation 200 of system 100. In implementation 200, content storage and retrieval subsystem 110 may include or be implemented within at least one server 210, and access subsystem 120 may include or be implemented within at least one access device 220 configured to communicate with server 210 by way of a network 225. Network 225 may include one or more networks, including, but not limited to, wireless networks, mobile telephone networks (e.g., cellular telephone networks), closed media networks, subscriber television networks, cable networks, satellite networks, the Internet, intranets, local area networks, public networks, private networks, optical fiber networks, broadband networks, narrowband networks, voice communications networks, Voice over Internet Protocol "(VoIP") networks, Public Switched Telephone Networks ("PSTN"), and any other networks capable of carrying data representative of content, content metadata, data management commands, and communications signals between access device 220 and server 210. Communications between the server 210 and the access device 220 may be transported using any one of above-listed networks, or any combination or sub-combination of the above-listed networks. In certain exemplary embodiments, network 225 includes a mobile telephone network and/or a subscriber television network.

Access device 220 may be associated with one or more users, which in certain embodiments may be subscribers to or users of one or more services (e.g., a wireless telephone service) provided over network 225. As an example, FIG. 2 shows user 230 as being associated with access device 220. The exemplary user 230 and the association of user 230 with access device 220 are shown for illustrative purposes. Other user associations with access device 220 may be defined in system 100.

Access device 220 may include any device configured to perform one or more of the content management processes described herein, including communicating with and/or transmitting and receiving content, content metadata, and content operation commands to/from content storage and retrieval subsystem 110 by way of network 225. Access device 120 may include, but is not limited to, a computing device (e.g., a desktop or laptop computer), a communication device, a wireless computing device, a wireless communication device (e.g., a mobile phone), a personal digital assistant, a content recording device (e.g., a camera, audio recorder, video camera), a vehicular computing and/or communication device, a content-enabled device, and any other device configured to perform one or more of the content management processes described herein. In certain exemplary embodiments, access device 220 includes a mobile telephone or a set-top box configured to access one or more services provided over network 225.

Figure 3:
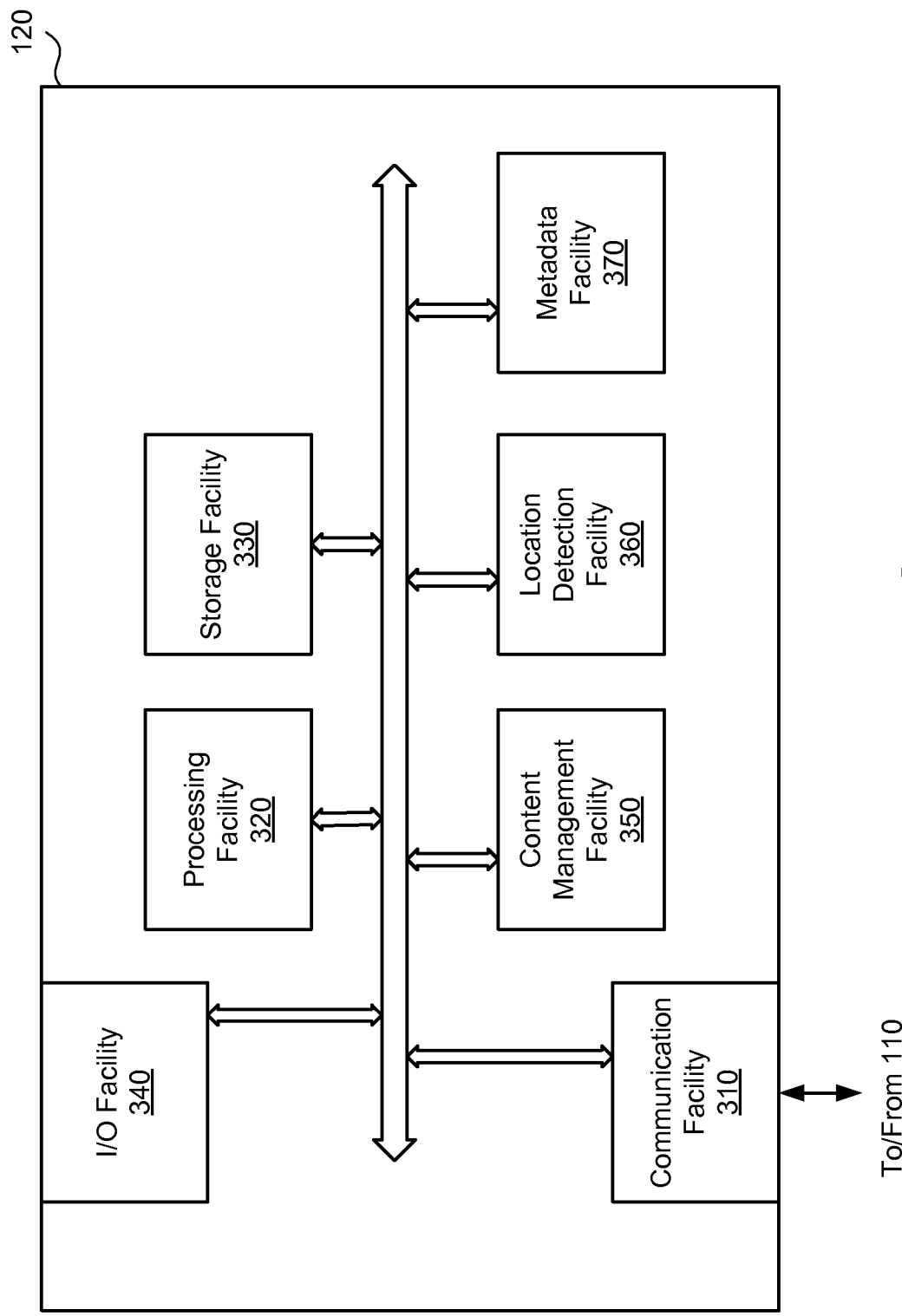
FIG. 3 illustrates exemplary components of an access subsystem.

FIG. 3 illustrates components of an exemplary access subsystem 120. As shown in FIG. 3, access subsystem 120 may include a communication facility 310, processing facility 320, storage facility 330, input/output ("I/O") facility 340, content management facility 350, location detection facility 360, and metadata facility 370 communicatively connected to one another. The facilities 310-370 may be communicatively connected using any suitable technologies. Each of the facilities 310-370 may be implemented as hardware, computing instructions (e.g., software) tangibly embodied on a computer-readable medium, or a combination of hardware and computing instructions configured to perform one or more of the processes described herein. In certain embodiments, for example, metadata management facility 370 and/or one or more other facilities may be implemented as one or more software applications embodied on a computer-readable medium such as storage facility 330 and configured to direct processing facility 320 of the access subsystem 120 to execute one or more of the processes described herein.

Communication facility 310 may be configured to communicate with content storage and retrieval subsystem 110 (e.g., over network 225), including sending and receiving data representative of content, content metadata, content management commands, and other communications to/from content storage and retrieval subsystem 110. Communication facility 310 may include any device, logic, and/or other technologies suitable for transmitting and receiving data representative of content, content metadata, content management commands, and other communications. In certain embodiments, communication facility 310 may be configured to support other network service communications over network 225, including wireless voice, data, and messaging service communications, for example. Communication facility 310 may be configured to interface with any suitable communication media, protocols, formats, platforms, and networks, including any of those mentioned herein.

Processing facility 320 may be configured to execute and/or direct execution of operations of one or more components of the access device 220. Processing facility 320 may direct execution of operations in accordance with computer-executable instructions such as may be stored in storage facility 330 or another computer-readable medium. As an example, processing facility 320 may be configured to process content, including demodulating, decoding, and parsing received content, and encoding and modulating content for transmission to content storage and retrieval subsystem 110.

Storage facility 330 may include one or more data storage media, devices, or configurations and may employ any type, form, and combination of storage media. For example, the storage facility 330 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Data, including data representative of content and/or content metadata (e.g., one or more content instances), may be temporarily and/or permanently stored in the storage facility 330.

I/O facility 340 may be configured to receive user input and provide user output and may include any hardware, firmware, software, or combination thereof supportive of input and output capabilities. For example, I/O facility 340 may include one or more devices for capturing or otherwise creating content, including, but not limited to, a still-shot camera, video camera, scanner, microphone, keyboard or keypad, touch screen component, and receiver (e.g., an RF or infrared receiver). Accordingly, a user 230 of access subsystem 120 may create content (e.g., by taking a picture or drafting a text message) and provide the content to content storage and retrieval subsystem 110, as described below.

I/O facility 340 may include one or more devices for presenting content for experiencing by the user 230, including, but not limited to, a graphics engine, a display, one or more display drivers, one or more audio speakers, and one or more audio drivers. Accordingly, I/O facility 340 may present content (e.g., play back and/or display) for experiencing by the user 230. I/O facility 340 may also be configured to provide other output for the user 230, including graphical user interfaces, indications of related content, and one or more tools for navigating related content, as described further below.

Content management facility 350 may be configured to provide one or more tools for management of content. The tools may include or be provided using hardware, computer-readable instructions embodied on a computer-readable medium such as storage facility 330 (e.g., one or more content management software applications), or a combination of hardware and computer-readable instructions. In certain embodiments, content management facility 350 may be implemented as a software application embodied on a computer-readable medium such as storage facility 330 and configured to direct the processing facility 320 of the access subsystem 120 to execute one or more of the content management operations described herein.

The tools may be configured to enable user 230 to create, modify, delete, annotate (e.g., edit, rate, label, add a note to, comment about, and categorize content), access, retrieve, copy, move, send, request, receive, and/or otherwise manage content. For example, a user 230 utilizing the content management tools may create and provide a content instance to content storage and retrieval subsystem 110. Through content management facility 350, the user 230 may access and manage (e.g., annotate, modify, copy, move, send, or delete) the content instance. Content management facility 350 may generate and provide content management commands to content storage and retrieval subsystem 110, which may be configured to receive and process the commands, and to identify and perform appropriate content management operations based on the commands. Content management commands may include instructions to store, modify, delete, annotate, access, retrieve, copy, move, and/or perform any other operations on content.

Metadata facility 370 may be configured to perform operations associated with content metadata, including generating, updating, and providing content metadata. Metadata facility 370 may include hardware, computer-readable instructions embodied on a computer-readable medium such as storage facility 330 (e.g., one or more content management software applications), or a combination of hardware and computer-readable instructions. In certain embodiments, metadata facility 370 may be implemented as a software application embodied on a computer-readable medium such as storage facility 330 and configured to direct the processing facility 320 of the access subsystem 120 to execute one or more of metadata operations described herein.

Metadata facility 370 may be configured to detect content management operations and to generate, update, and/or provide metadata associated with the operations. For example, when a content instance is created, metadata facility 370 may detect the creation of the content instance and identify and provide to data store 330 one or more metadata values associated with the content instance, such as time metadata indicating a time at which the content instance is created, user metadata indicating a user who created the metadata, content type metadata indicating a type (e.g., a file type or predefined content category) to be associated with the content instance, and location metadata indicating a location at which the content instance is created. As an example, if access subsystem 120 is utilized to capture a photograph, metadata facility 370 may detect the creation of the photograph and generate and provide metadata indicating a time at which the photograph is taken, a user associated with the access subsystem 120 who took the photograph, a content type associated with the photograph (e.g., a photo or image category type, or a file type for a digital photograph), and a location at which the photograph is taken (e.g., a geographic location).

Metadata facility 370 may in similar manner detect other content operations and generate, update, delete, and/or provide metadata associated with the content operations. For example, if the photograph is sent to a destination, such as by transmitting a copy of the photograph over network 225, metadata facility 370 may detect the sending of the photograph and generate and provide metadata indicating a time at which the photograph is sent and the destination to which the photograph is sent (e.g., a user or remote device identifier). Similarly, if another photograph is received by access subsystem 120 from a source, metadata facility 370 may detect the receipt of the other photograph and generate and provide metadata indicating a time at which the other photograph is received and the source that provided the other photograph (e.g., a user or remote device identifier).

As mentioned, content metadata may include location information associated with content. Location detection facility 360 may include any hardware, computing instructions (e.g., software), or combination thereof configured to detect a location of the access subsystem 120. The location may include a network address and/or a geographic location of access subsystem 120. In some embodiments, the location detection facility 360 may be configured to utilize Global Positioning System ("GPS") technologies to determine the geographic location of the access subsystem 120 according to GPS coordinates. Other suitable technologies for determining location may be used in other embodiments, including using principles of trilateration to evaluate radio frequency signals received by the access subsystem 120 (e.g., RF signals in a wireless phone network) and to estimate the geographic location of the access subsystem 120. Such capabilities may be especially helpful when access subsystem 120 is portable (e.g., access subsystem 120 includes or is implemented within a mobile phone).

Metadata facility 370 may provide content metadata to content storage and retrieval subsystem 110 or to content management facility 350, which may be configured to associate the content metadata with the corresponding content and provide the content and/or content metadata to content storage and retrieval subsystem 110. The content metadata may be pushed to or pulled by content storage and retrieval subsystem 110 in accordance with a defined schedule or frequency, or in response to the occurrence of defined events such as a content management operation. As will now be described, content storage and retrieval subsystem 110 may be configured to maintain and utilize the content metadata to identify relationships between content instances, and to utilize the relationships to identify and retrieve related content.

FIG. 4A illustrates an exemplary content storage and retrieval subsystem 110. The components of content storage and retrieval subsystem 110 may include or be implemented as hardware, computing instructions (e.g., software) embodied on a computer-readable medium, or a combination thereof. In certain embodiments, for example, one or more components of content storage and retrieval subsystem 110 may include or be implemented on one or more servers, such as server 210, configured to communicate over network 125.

While an exemplary content storage and retrieval subsystem 110 is shown in FIG. 4A, the exemplary components illustrated in FIG. 4A are not intended to be limiting. Indeed, additional or alternative components and/or implementations may be used.

As shown in FIG. 4A, content storage and retrieval subsystem 110 may include a communication module 410, which may be configured to communicate with access subsystem 120, including receiving data representative of content, content metadata, and content data operations from access subsystem 120 and providing data representative of content to access subsystem 120 by way of network 125. The communication module 410 may include and/or support any suitable communication platforms and technologies for communicating with and transporting content and associated data to/from access subsystem 120. Communication module 410 may be configured to support a variety of communication platforms, protocols, and formats such that content storage and retrieval subsystem 110 can receive content from and distribute content to a variety of computing platforms (e.g., a mobile telephone service platform, a web-based platform, a subscriber television platform, etc.) and using a variety of communications technologies. Accordingly, the content storage and retrieval subsystem 110 can support a multi-platform system in which content can be received from and provided to diverse platforms.

Content storage and retrieval subsystem 110 may include a processing module 420 configured to control operations of components of the content storage and retrieval subsystem 110. Processing module 420 may direct execution of operations in accordance with computer-executable instructions stored to a computer-readable medium such as a data store 430. As an example, processing module 420 may be configured to process (e.g., encode, decode, modulate, and/or demodulate) content, content metadata, and communications received from or to be transmitted to access subsystem 120. As another example, processing module 420 may be configured to perform data management operations on data stored in data store 430, including any of the content management operations described above. For example, processing module 420 may operate on content and content metadata, including storing content data 440 and content metadata 450 to data store 430 as shown in FIG. 4A and indexing, searching, accessing, retrieving, modifying, annotating, copying, and/or deleting content data 440 and content metadata 450.

Data store 430 may include one or more data storage media, devices, or configurations and may employ any type, form, and combination of storage media. For example, the data store 430 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Data store 430 may store any suitable type or form of electronic data, including content data 440 and content metadata 450. Content data 440 may include or be stored within one or more content instances, and content metadata 450 may include metadata associated with the content instances. In certain embodiments, content data 440 and content metadata 450 may be stored using one or more suitable data entities and/or structures, including one or more relational or hierarchical data tables, for example. In other embodiments, content metadata 450 may be stored as part of the content instances to which the content metadata 450 is associated.

Content storage and retrieval subsystem 110 may include a tracking module 460, which may be configured to track content management operations and/or content metadata updates and to update content data 440 and/or content metadata 450 accordingly. For example, tracking module 460 may recognize content management commands received from access subsystem 120 and may instruct processing module 420 to operate on content data 440 and/or content metadata 450 based on the commands. For instance, content storage and retrieval subsystem 110 may receive a content operation command instructing that content data 440 be modified. Tracking module 460 may recognize the command, determine a time at which a content modification operation is performed, and update the content metadata 450 to include data representative of the time at which the content modification is performed. Alternatively or additionally, tracking module 460 may be configured to recognize metadata updates received from access subsystem 120 and may instruct processing module 420 to carry the updates into the content metadata 450.

As shown in FIG. 4A, content storage and retrieval subsystem 110 may further include a content relationship module 470, which may include or be implemented as hardware, computing instructions (e.g., software) tangibly embodied on a computer-readable medium, or a combination of hardware and computing instructions configured to perform one or more of the relative content retrieval processes described herein. In certain embodiments, content relationship module 470 may be implemented as a software application embodied on a computer-readable medium such as data store 430 and configured to direct the processing module 420 to execute one or more of the processes described herein.

Content relationship module 470 may be configured to identify certain "relationships" between content instances included in the content data 440 and to utilize the identified relationships to selectively identify and retrieve related content instances. The conditions needed to qualify as a "relationship" between content instances may be defined in advance. For example, content relationship module 470 may include or otherwise have access to a predefined relationship heuristic, which may include one or more conditions defining one or more relationships. When a set of one or more conditions for a relationship is satisfied, content relationship module 470 may identify the existence of the relationship between content instances. Examples of relationships between content, i.e., content relationships, may include, but are not limited to, location based relationships, time based relationships, content type relationships, content source based relationships, content destination based relationships, and user based relationships. These examples are illustrative only. The relationships and conditions for the relationships may be tailored as may suit a particular implementation or application of system 100.

In certain examples, a relationship may be defined to exist between content instances when content metadata 450 associated with content instances includes common metadata values. For example, a location based relationship between content instances may be determined to exist when location metadata values for the content instances are at least substantially the same. For instance, two photographs created at a common location (e.g., the same geographic location or network address) may be determined to be related by location. Similarly, common metadata values for other components of metadata may be used to determine that other types of relationships exist. Examples of other metadata components may include, but are not limited to, time metadata, user metadata, content type metadata, and source and/or destination metadata. These metadata components may be used to determine whether time based, user based, content type based, content source based, and content destination based relationships exist between content instances. An exemplary time based relationship may identify substantially concurrent performance of content management operations such as creation of content instances at substantially the same time. An exemplary user based relationship may identify that content management operations were initiated by or otherwise associated with the same user or user profile. An exemplary content type based relationship may identify content instances that are of the same type (e.g., same predefined category or file type). An exemplary content source based relationship may identify that content instances have been received from a common source. An exemplary content destination based relationship may identify content instances that have been sent to a common destination.

In certain examples, common metadata values may refer to metadata values that are within a predefined threshold of one another. For example, a location based relationship between content instances may be determined to exist when location metadata values for the content instances are within a predefined maximum geographic distance threshold. For instance, two photographs created at locations that are geographically nearer to one another than the predefined maximum distance may be determined to be related by location. Similarly, predefined thresholds for metadata values for other components of metadata (e.g., a predefined maximum period of time between two time data values) may be used to define and determine that other relationships exist.

Conditions for relationships may be custom defined by user 230. Content storage and retrieval subsystem 110 and/or access subsystem 120 may include a relationship manager module configured to provide one or more tools for custom definition of content relationships. The tools may be provided in any suitable way and may include any mechanism or process that user 230 may utilize to custom define one or more conditions for a content relationship. For example, the relationship manager module may be configured to generate and provide a graphical user interface for display. The graphical user interface may include one or more tools configured to enable the user 230 to customize relationship definition conditions (e.g., common metadata value thresholds). For instance, the user 230 may be able to adjust a maximum distance threshold value to be used for identifying location based content relationships. Similarly, the user 230 may be able to adjust other relationship thresholds. In certain examples, the user 230 may be able to select and deselect any particular metadata component for use or non-use in identifying content relationships. For instance, the user 230 may deactivate certain conditions in the predefined relationship heuristic such that content relationship module 470 will not use the deactivated conditions when identifying relationships. As an example, user 230 may deactivate conditions for time based relationships for a particular content management operation (e.g., sending content) such that time based relationships for the content management operation will not be identified.

FIG. 4B illustrates content storage and retrieval subsystem 110 with an exemplary relationship manager module 480 employed therein. Relationship manager module 480 may be accessible to user 230 by way of access subsystem 120 and may be configured to operate in any of the ways described above.

Content relationship module 470 may be configured to identify relationships between content instances at any suitable time. For example, content relationship module 470 may be configured to identify content relationships in accordance with a predefined schedule or frequency, or at off-peak times. Alternatively or additionally, content relationship module 470 may be configured to identify content relationships in response to the occurrence of a content management operation, such as when a new content instance is received and stored to data store 430. In certain embodiments, content relationship module 470 is configured to dynamically identify one or more content relationships in response to a request for access to and/or retrieval of a content instance.

Figure 5B:
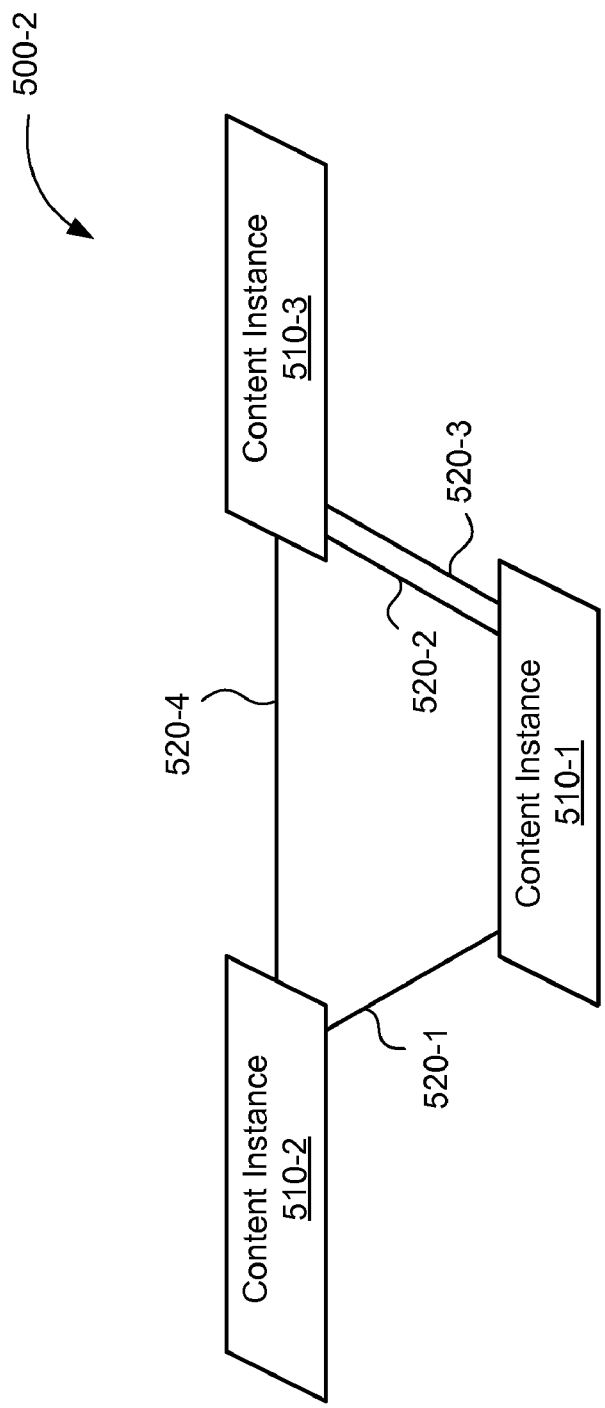

Content instances and the identified relationships between the content instances may form a virtual content relationship map. FIGS. 5A-D illustrate examples of virtual content relationships maps including content instances and relationships between the content instances as may be stored in data store 430. As shown in FIG. 5A, a virtual content relationship map 500-1 may include content instances 510-1 and 510-2 related to one another by relationship 520-1. Content relationship 520-1 may be identified in any of the ways described above, including using a predefined relationship heuristic and content metadata 450 to identify existence of a content relationship between content instances 510-1 and 510-2. As a specific example, user 230 utilizing access subsystem 120 may capture and provide to content storage and retrieval subsystem 110 data representing a photograph and metadata associated with the photograph, e.g., a geographic location at which the photograph is captured. The photograph may be stored in data store 430 as content instance 510-1. At substantially the same geographic location, user 230 may create and provide another content instance 510-2 and associated metadata to content storage and retrieval subsystem 110. For example, content instance 510-2 may be a data object (e.g., a v-card) including contact information for a person the user 230 encountered at the geographic location. Content relationship module 470 may be configured to identify, based on the predefined relationship heuristic and the metadata associated with content instances 510-1 and 510-2, existence of a location-based relationship 520-1 between content instances 510-1 and 510-2.

While at substantially the same geographic location, user 230 may utilize access subsystem 120 to capture and provide another photograph to content storage and retrieval subsystem 110, which may be represented as content instance 510-3 in FIG. 5B. Content relationship module 470 may be configured to identify, based on the predefined relationship heuristic and the metadata associated with content instances 510-1, 510-2, and 510-3, existence of relationships between content instances 510-1, 510-2, and 510-3. In addition to location based relationship 520-1, the identified relationships may include location based relationship 520-2 between content instances 510-1 and 510-3 representing a common geographic location, content type relationship 520-3 between content instances 510-1 and 510-3 representing a common content type (e.g., photograph type or file type), and location based relationship 520-4 between content instances 510-2 and 510-3 representing a common geographic location. Content instances 510-1, 510-2, and 510-3 and relationships 520-1, 520-2, 520-3, and 520-4 may form virtual content relationship map 500-2.

Figure 5C:
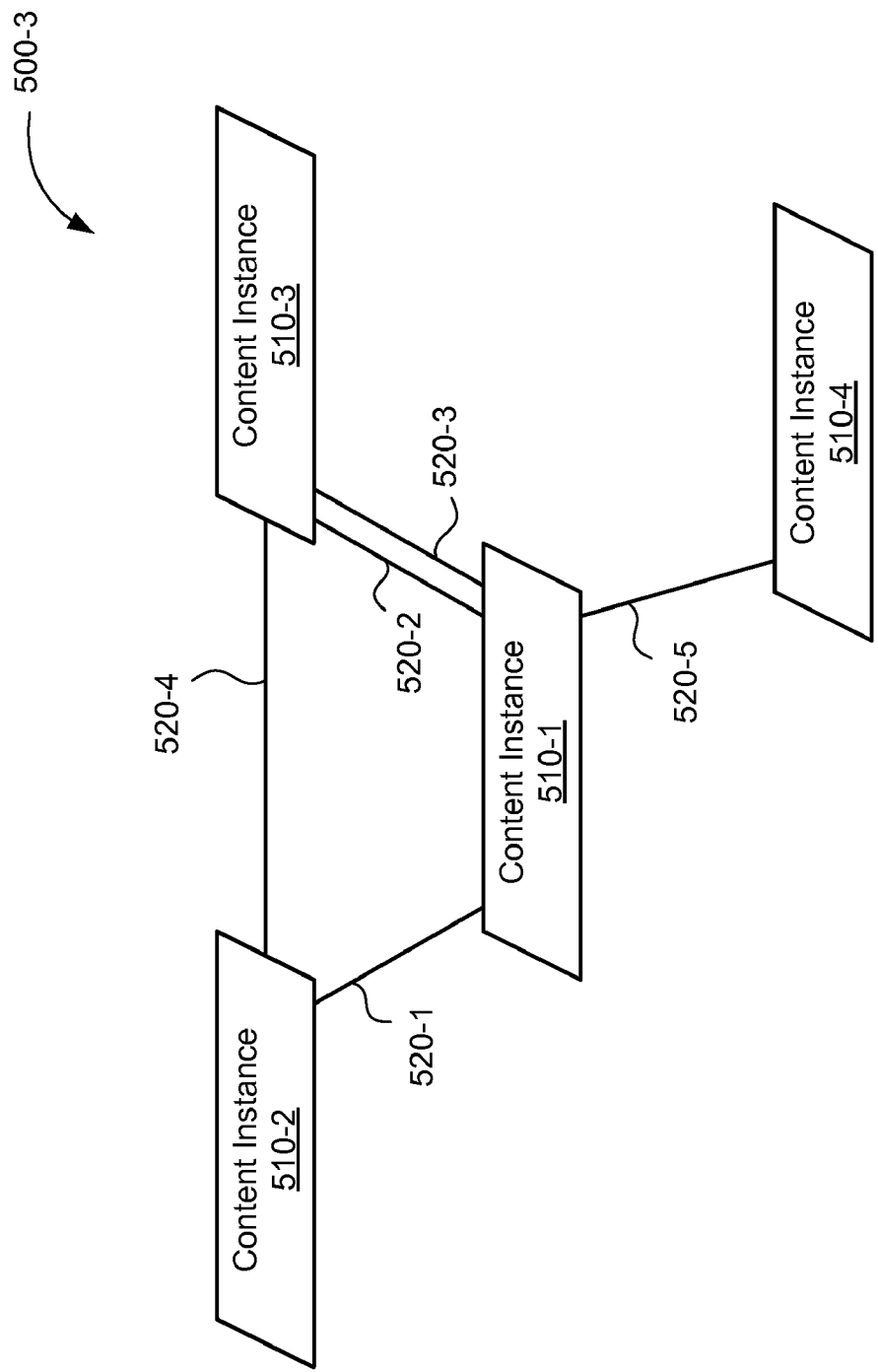

Subsequent to moving away from the geographic location, user 230 may utilize access device 120 to create and transmit a message (e.g., an SMS, MMS, or electronic mail message) to a destination (e.g., a remote device connected to network 225). A copy of content instance 510-1 may be included in the message. Data representative of the message and associated metadata may be provided to content storage and retrieval subsystem 110, which may store the message as content instance 510-4 as shown in FIG. 5C. Content relationship module 470 may be configured to identify, based on the predefined relationship heuristic and the metadata associated with content instances 510-1 and 510-4, existence of a content relationship 520-5 between content instances 510-1 and 510-4. In this particular example, the relationship 520-5 may indicate that content instance 510-1 was an attachment included in content instance 510-4. This may be referred to a message attachment type content relationship. Content instances 510-1, 510-2, 510-3, and 510-4 and relationships 520-1, 520-2, 520-3, 520-4, and 520-5 may form virtual content relationship map 500-3.

User 230 utilizing access subsystem 120 may instruct content storage and retrieval subsystem 110 to delete content instance 510-3. The content instance 510-3 may be deleted, and tracking module 460 may detect the deletion and update content metadata 450 accordingly. Accordingly, the relationships 520-2, 520-3, and 520-4 may be removed along with content instance 510-3. FIG. 5D illustrates the virtual content relationship map 500-3 shown in FIG. 5C but with content instance 510-3 and relationships 520-2, 520-3, and 520-4 having been removed. The resulting configuration of content instances 510-1, 510-2, and 510-3 and content relationships 520-1 and 520-5 may form virtual content relationship map 500-4 as shown in FIG. 5D.

In certain embodiments, the virtual content relationship maps 500-1 through 500-4 illustrated in FIGS. 5A-D may be specific to a single user. That is, the content instances 510 may all be provided by, owned by, or otherwise associated with a common user, such as user 230. Accordingly, relationships 520 may be representative of and based on one or more data operations initiated by user 230. Hence, content instances, metadata associated with the content instances, content relationships, and a corresponding virtual content relationship map may be specific to a single user. As described further below, content storage and retrieval subsystem 110 may be configured to maintain and/or form a plurality of user-specific virtual content relationship maps for different users.

One or more components of system 100, including a virtual content relationship map formed by content relationship module 470 may be implemented in or on top of an existing file system such as a standard hierarchical data file system (e.g., a FAT32, NTFS, UFS, JFS, HFS, or HFS+ file system). In certain embodiments, for example, content data 440 may be hierarchically organized and stored in data store 430 using a standard data file system, and content relationship module 470 may use the content data 440 to form a virtual content relationship map on top of the standard data file system.

Content storage and retrieval subsystem 110 and/or access subsystem 120 may be configured to provide one or more tools enabling user 230 to selectively navigate a virtual content relationship map. For example, content storage and retrieval subsystem 110 and/or access subsystem 120 may be configured to provide a graphical user interface with one or more content navigation tools configured to enable user 230 to traverse relationships 520 forming paths between content instances 510 in a virtual content relationship map. Accordingly, user 230 may traverse a path of one or more content relationships 520 to locate a particular content instance 510. For example, user 230 may start at one particular content instance 510-4 in virtual content relationship map 500-3 and traverse content relationship 520-5 to another content instance 510-1 and so on until user 230 locates a particular content instance (e.g., content instance 510-2) in the virtual content relationship map 500-3.

Figure 6B:
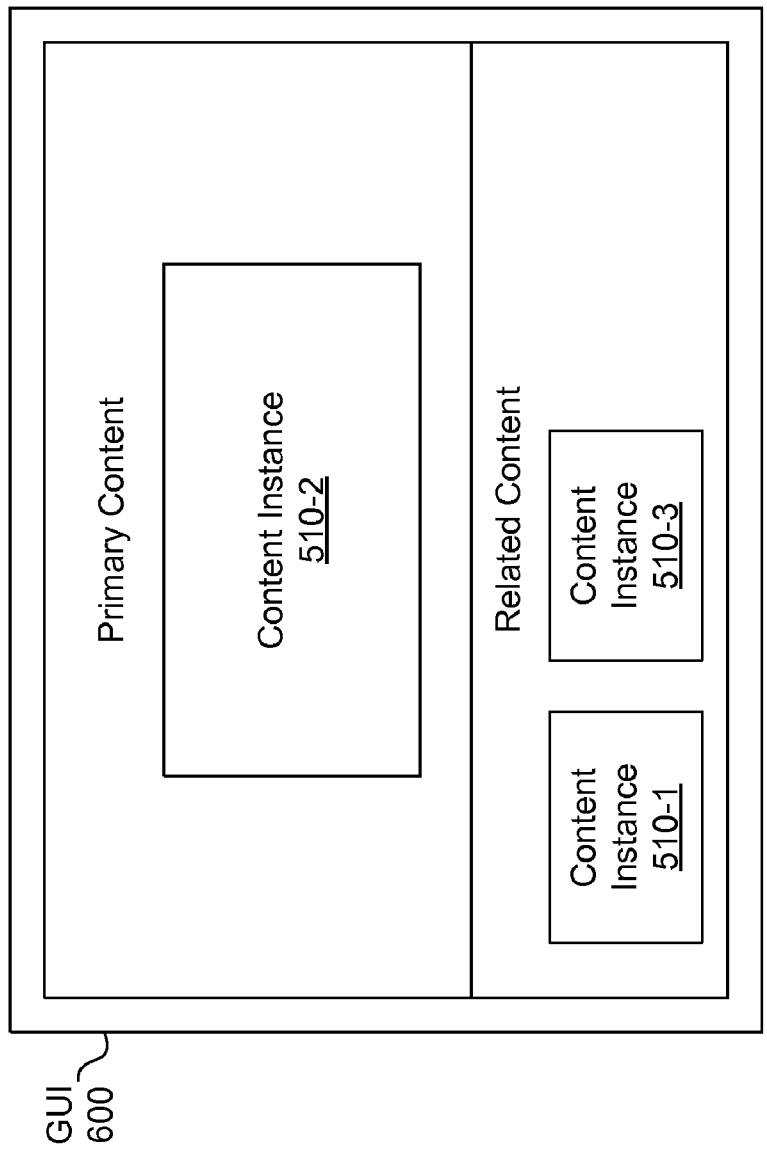

FIGS. 6A-C illustrate an exemplary graphical user interface ("GUI") 600 in which retrieved content may be displayed. For example, user 230 may utilize access subsystem 120 to provide a content retrieval request to content storage and retrieval subsystem 110. The request may be in any suitable form and may include one or more content identifiers or content search parameters. As an example, user 230 may request retrieval of content instance 510-1. Content storage and retrieval subsystem 110 may recognize the request and identify, retrieve, and provide content instance 510-1 to access subsystem 120 based on the request. Content storage and retrieval subsystem 110 may also identify content relationships 520 associated with content instance 510-1 in any of the ways described above and utilize the identified relationships 520 to identify, retrieve, and provide related content instances to access subsystem 120. The access subsystem 120 may be configured to display the retrieved content, including content instance 510-1 and the related content instances in GUI 600. For example, for the virtual content relationship map 500-3 shown in FIG. 5C, content storage and retrieval subsystem 110 may, in response to the request, retrieve and provide content instance 510-1, as well as related content instances 510-2, 510-3, and 510-4 having direct relationships 520-1 through 520-5 with content instance 510-1.

The retrieved content instances 510-1, 510-2, 510-3, and 510-4 may be displayed in GUI 600 as shown in FIG. 6A. As shown, content instance 510-1 may be indicated as "primary content," and content instances 510-2, 510-3, and 510-4 may be indicated as "related content," i.e., content related to the primary content, in GUI 600.

In GUI 600, user 230 may select one of the related content instances 510-2, 510-3, and 510-4 to cause the selected content instance to be moved from the related content section to the primary content section in GUI 600. For example, user 230 may select content instance 510-2, and GUI 600 may be updated as shown in FIG. 6B. As shown, content instance 510-2 is now indicated as "primary content," and content instances 510-1 and 510-3 are now indicated as "related content." When user 230 selects content instance 510-2 in GUI 600 of FIG. 6A, content storage and retrieval subsystem 110 may recognize the selection and retrieve content instance 510-2. Content storage and retrieval subsystem 110 may identify content instances 510-1 and 510-3 as having direct content relationships 520-1 and 520-4 with content instance 510-2. Accordingly, content instance 510-2 may be retrieved and provided to access subsystem 120 as "primary content," and content instances 510-1 and 510-3 may be retrieved and provided to access subsystem 120 as "related content."

By selecting content instance 510-2 in FIG. 6A, user 230 has traversed relationship 520-1 to cause processing to move from content instance 510-1 to content instance 510-2. In other words, user 230 has selected and used a relationship-defined path from one content instance 510-1 to another content instance 510-2 to locate content instance 510-2. In similar manner, user 230 may to select other related content to traverse another path in virtual content relationship map 500-3.

In certain embodiments, GUI 600 may provide information descriptive of how related content is related to primary content. For example, GUI 600 may be configured to indicate relationship types for related content instances 510. FIG. 6C illustrates GUI 600 including information indicating that related content instance 510-1 is related to content instance 510-2 by a location based relationship and that related content instance 510-3 is also related to content instance 510-2 by a location based relationship. The relationship type indicators shown in FIG. 6C are illustrative only. Other types of relationships may be indicated, and any suitable indicator mechanism may be employed.

The relationship type indicators may assist user 230 in selectively traversing the virtual content relationship map 500-3. For example, user 230 may recall meeting the person associated with the contact information included in content instance 510-2 but may not remember the name of the person. However, user 230 may recall the geographic location as which user 230 met the person and that the photograph associated with content instance 510-1 was captured at the same location. User 230 may retrieve content instance 510-1 and use relationship type indicators in GUI 600 to look for related content instances 510 having location based relationships with content instance 510-1. User 230 may select and retrieve such a content instance 510-2. In this or similar manner, user 230 may leverage content relationships between content instances 510 to locate a particular content instance 510-2.

While FIGS. 6A-C show related content displayed in GUI 600, this is illustrative only. Related content may be indicated in any suitable manner. For example, the related content section may include selectable links to related content instances 510.

In the examples described above, user 230 may utilize access subsystem 120 to provide and retrieve content, as well as to manage content and define conditions for content relationships such that content storage and retrieval subsystem 110 can form and/or maintain a virtual content relationship map of content associated with user 230. In certain embodiments, access subsystem 120 may be configured such that user 230 may utilize multiple access devices to provide, manage, and retrieve content and defined content relationships.

For example, FIG. 7 illustrates an exemplary implementation 700 of system 100. As shown in FIG. 7, the implementation 700 may include content storage and retrieval subsystem 110 and an access device 220 configured to communicate with one another by way of a mobile phone network 710. Access device 220 may communicate with the content storage and retrieval subsystem 110 over mobile phone network 710 in any of the ways described above. Accordingly, user 230 may utilize access device 220 to post, manage, and retrieve content, including related content as described above. In addition, content storage and retrieval subsystem 110 may be configured to communicate with an additional access device 720 over another connection such as a connection over the Internet 730. In addition, content storage and retrieval subsystem 110 may be configured to communicate with another additional access device 740 (e.g., a set-top box) over another connection such as a connection over a subscriber television network 750. Hence, user 230 may be able to utilize access device 220, additional access device 720, and/or additional access device 740 to post, manage, and retrieve content. Mobile phone network 710, the Internet 730, and subscriber television network 750 may be part of network 225 shown in FIG. 2.

Figure 8:
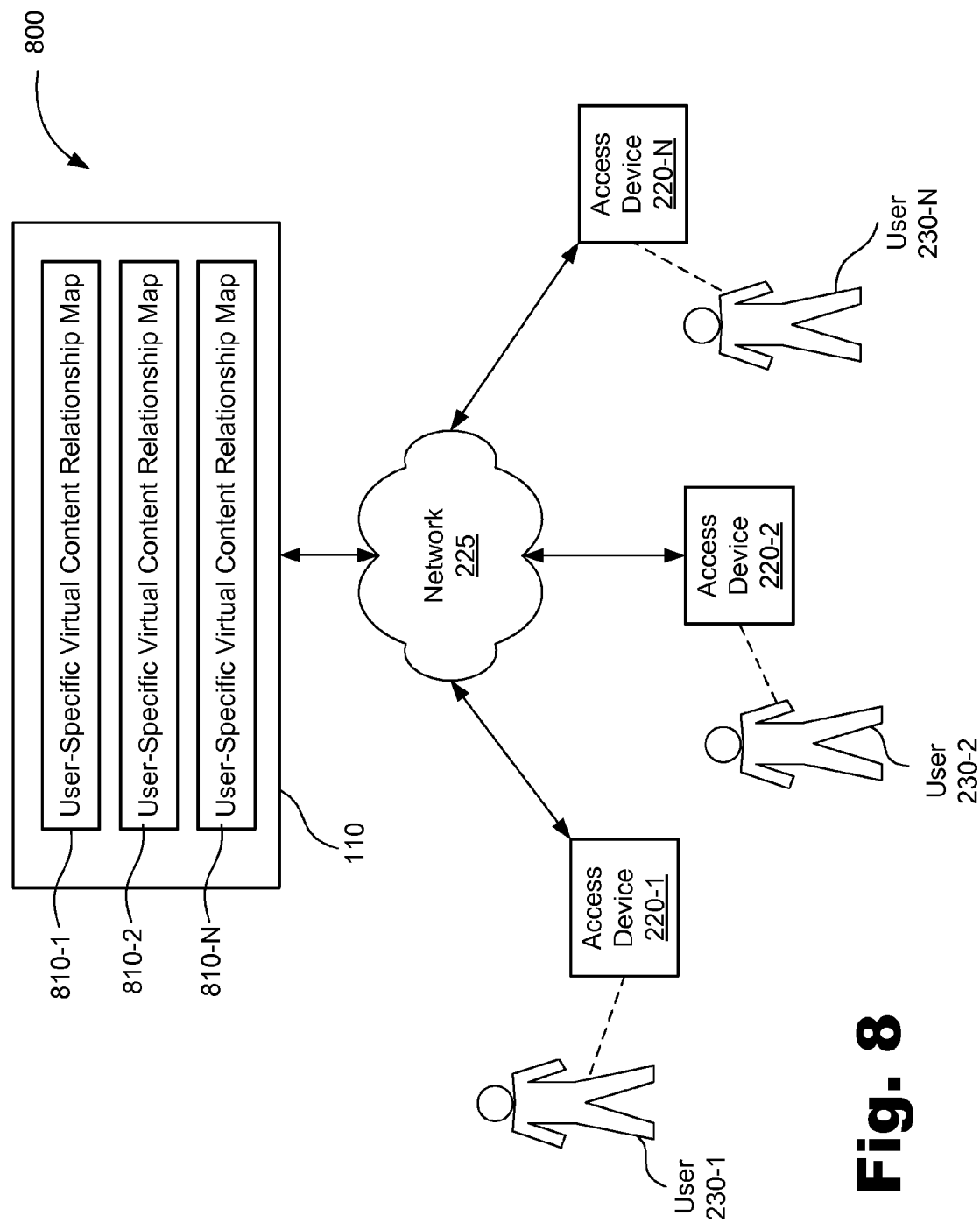
FIG. 8 illustrates another exemplary implementation of the system of FIG. 1.

As mentioned above, content storage and retrieval subsystem 110 may be configured to generate and/or maintain a plurality of user-specific virtual content relationship maps. FIG. 8 illustrates another implementation 800 of system 100 in which multiple users 230-1 through 230-N may utilize multiple access devices 220-1 through 220-N, respectively, to provide, manage, and retrieve content. Access devices 220-1 through 220-N and content storage and retrieval subsystem 110 may be configured to communicate over network 225.

As shown in FIG. 8, content storage and retrieval subsystem 110 may form and/or maintain user-specific virtual content relationship maps 810-1 through 810-N, which may be associated with users 230-1 through 230-N, respectively. Accordingly, content storage and retrieval subsystem 110 may generate and maintain multiple user-specific virtual content relationship maps 810-1 through 810-N, which may be defined in accordance with user-specific content and definitions of content relationships.

Figure 9:
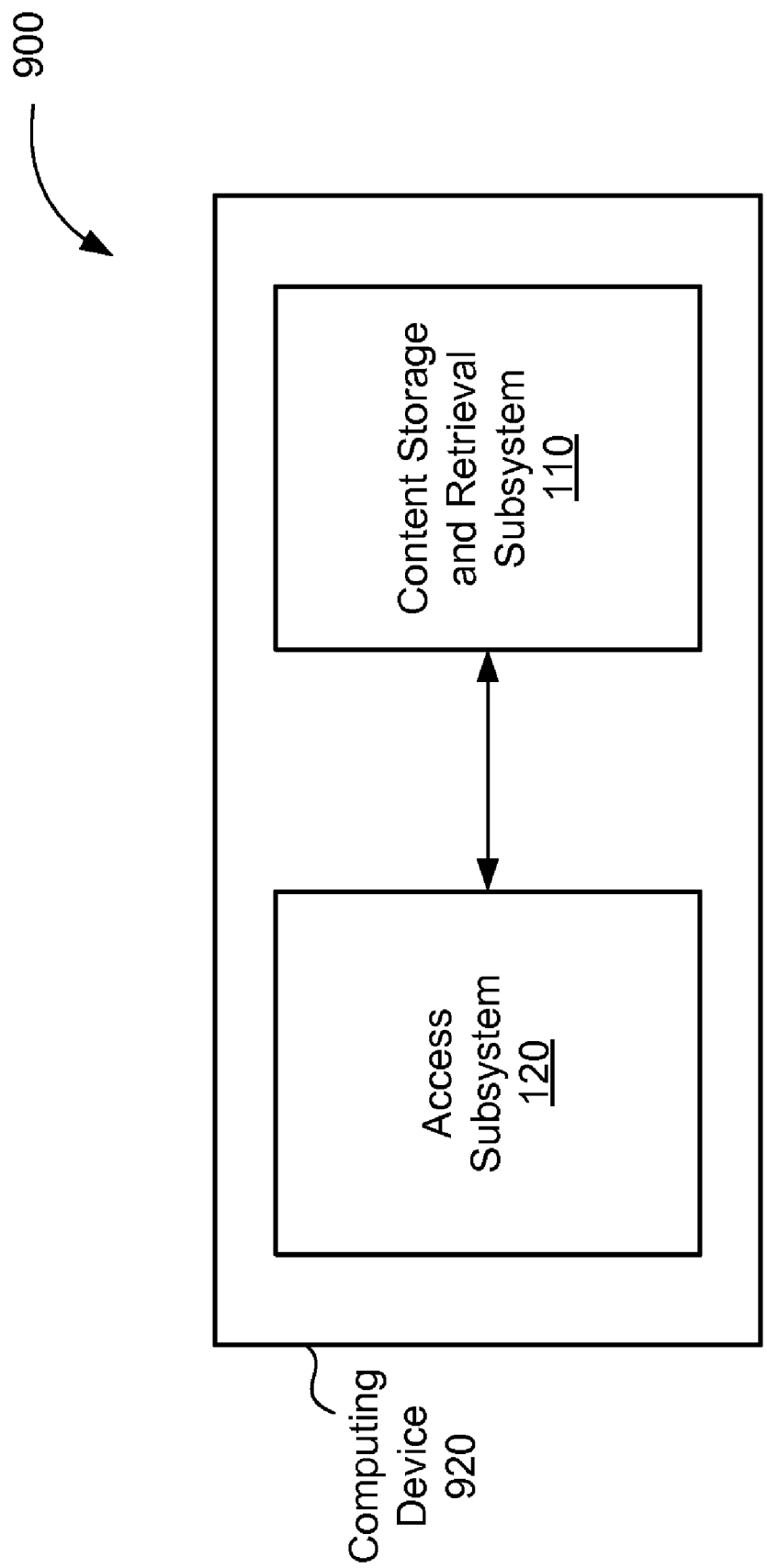
FIG. 9 illustrates an exemplary local implementation of the system of FIG. 1.

FIG. 9 illustrates an exemplary local implementation 900 of system 100. As shown in FIG. 9, access subsystem 120 and content storage and retrieval subsystem 110 of system 100 may be implemented in a single computing device 920. Accordingly, the principles and processes described herein may be employed for local content storage, management, and retrieval, including retrieval of related content.

Figure 10:
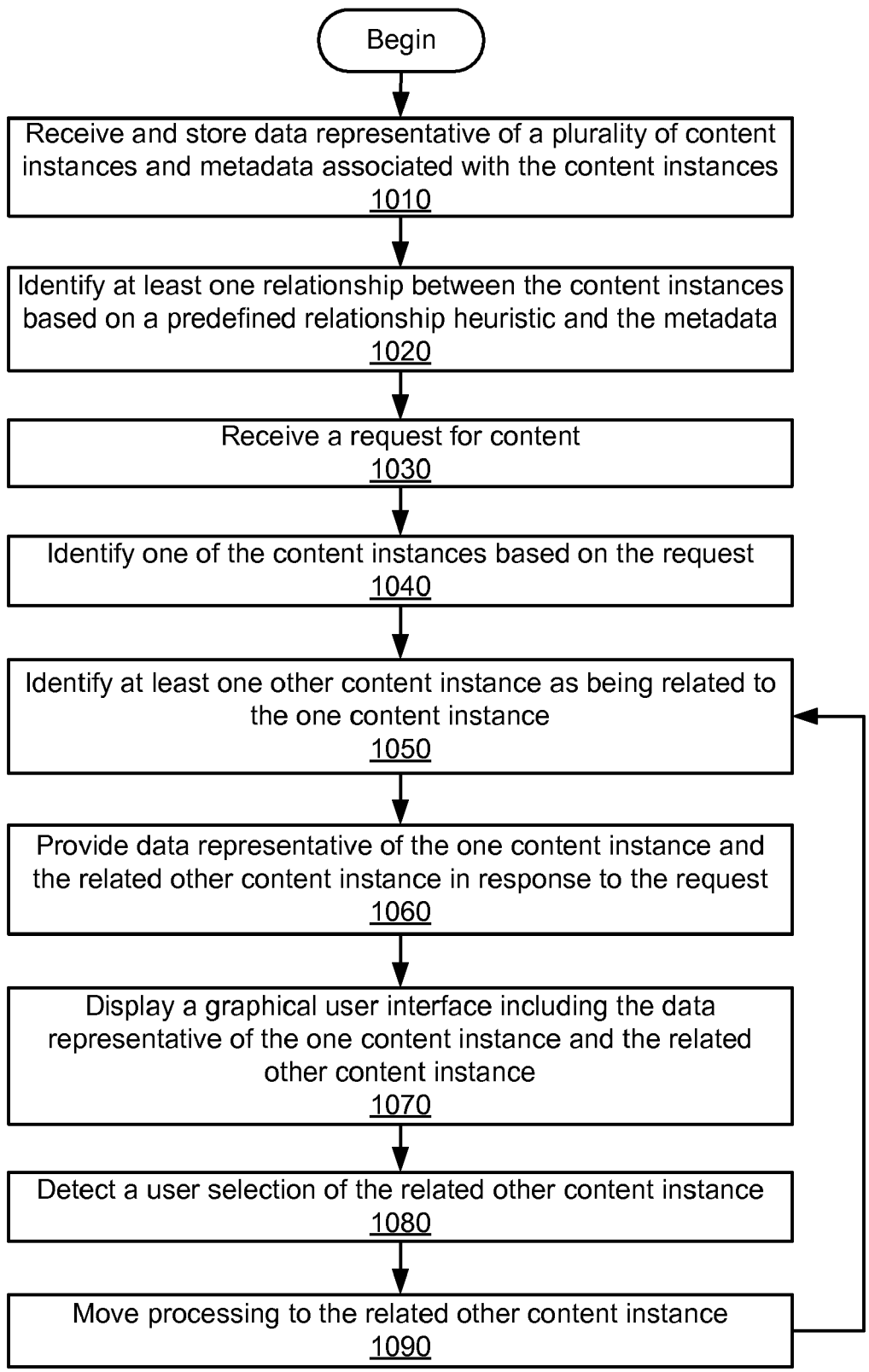
FIG. 10 illustrates an exemplary relative content storage and retrieval method.

FIG. 10 illustrates an exemplary method of relative content storage and retrieval. While FIG. 10 illustrates exemplary steps according to one embodiment, other embodiments may omit, add to, reorder, and/or modify any of the steps shown in FIG. 10.

In step 1010, data representative of a plurality of content instances and metadata associated with the content instances is received and stored. Step 1010 may be performed in any of the ways described above, including content storage and retrieval subsystem 110 receiving the content instances and metadata from access subsystem 120 and storing the content instances and metadata to data store 430 as content data 440 and content metadata 450. In certain embodiments, the content instances and metadata may be included in one or more content postings provided by a user utilizing access subsystem 120 to communicate with content storage and retrieval subsystem 110.

In step 1020, at least one relationship between the content instances is identified based on a predefined relationship heuristic and the metadata. Step 1020 may be performed in any of the ways described above and may utilize any suitable definition of content relationships as specified in the predefined relationship heuristic. The identified relationship(s) and content instances may form a virtual content relationship map such as any of those illustrated in FIGS. 5A-D.

In step 1030, a request for content is received. Step 1030 may be performed in any of the ways described above, including content storage and retrieval subsystem 110 receiving the request for content from access subsystem 120.

In step 1040, one of the content instances is identified based on the request. Step 1040 may be performed in any of the ways described above, including content storage and retrieval subsystem 110 using information included in the request to search for and locate the content instance. Metadata associated with the content instance may include information that is determined to match information included in the request.

In step 1050, at least one other content instance is identified as being related to the one content instance identified in step 1040. Step 1050 may be performed in any of the ways described above, including content storage and retrieval subsystem 110 making the identification based on the predefined relationship heuristic and the metadata, or on a relationship identified in step 1020.

In step 1060, data representative of the one content instance and the related other content instance is provided in response to the request. Step 1060 may be performed in any of the ways described above, including content storage and retrieval subsystem 110 providing the data to access subsystem 120.

In step 1070, a graphical user interface including the data representative of the one content instance and the related other content instance is displayed. Step 1070 may be performed in any of the ways described above, including access subsystem 120 displaying the graphical user interface for consideration by a user of the access subsystem 120.

In step 1080, a user selection of the related other content instance is detected. Step 1080 may be performed in any of the ways described above, including access subsystem 120 detecting a user selection of the related other content instance, or a visual object corresponding with the related other content object, included in the graphical user interface. Step 1080 may include access subsystem 120 notifying content storage and retrieval subsystem 110 of the detected user selection.

In step 1090, processing is moved to the related other content instance. Step 1090 may be performed in response to the detected user selection in step 1080. Step 1090 may be performed in any of the ways described above, including traversing a content relationship connecting the one content instance to the related other content instance and making the related other content instance the central focus of subsequent processing.

As shown in FIG. 10, from step 1090, processing may return to step 1050, and any of steps 1050-1090 may be repeated with the processing now being focused on the related other content instance. This loop may be repeated each time another related content instance is selected. Accordingly, a user can traverse one or more content relationships to create and navigate a path between one or more content instances. In this manner, the user may leverage content relationships to conveniently search for and locate a desired content instance.

In certain embodiments, user-specific virtual content relationship maps 810, such those as described above in relation to FIG. 8, may be combined to form a multi-user virtual content relationship map defining relationships between content instances 510 associated with a plurality of users 230. Accordingly, a group of users 230 (e.g., a social networking group, a work group, a family, a group of friends, etc.) may be defined in system 100, and content associated with the users 230 in the group may be combined in a multi-user content space such as a multi-user virtual content relationship map. Each user 230 in the group may be granted access to the content in the multi-user content space.

Figure 11:
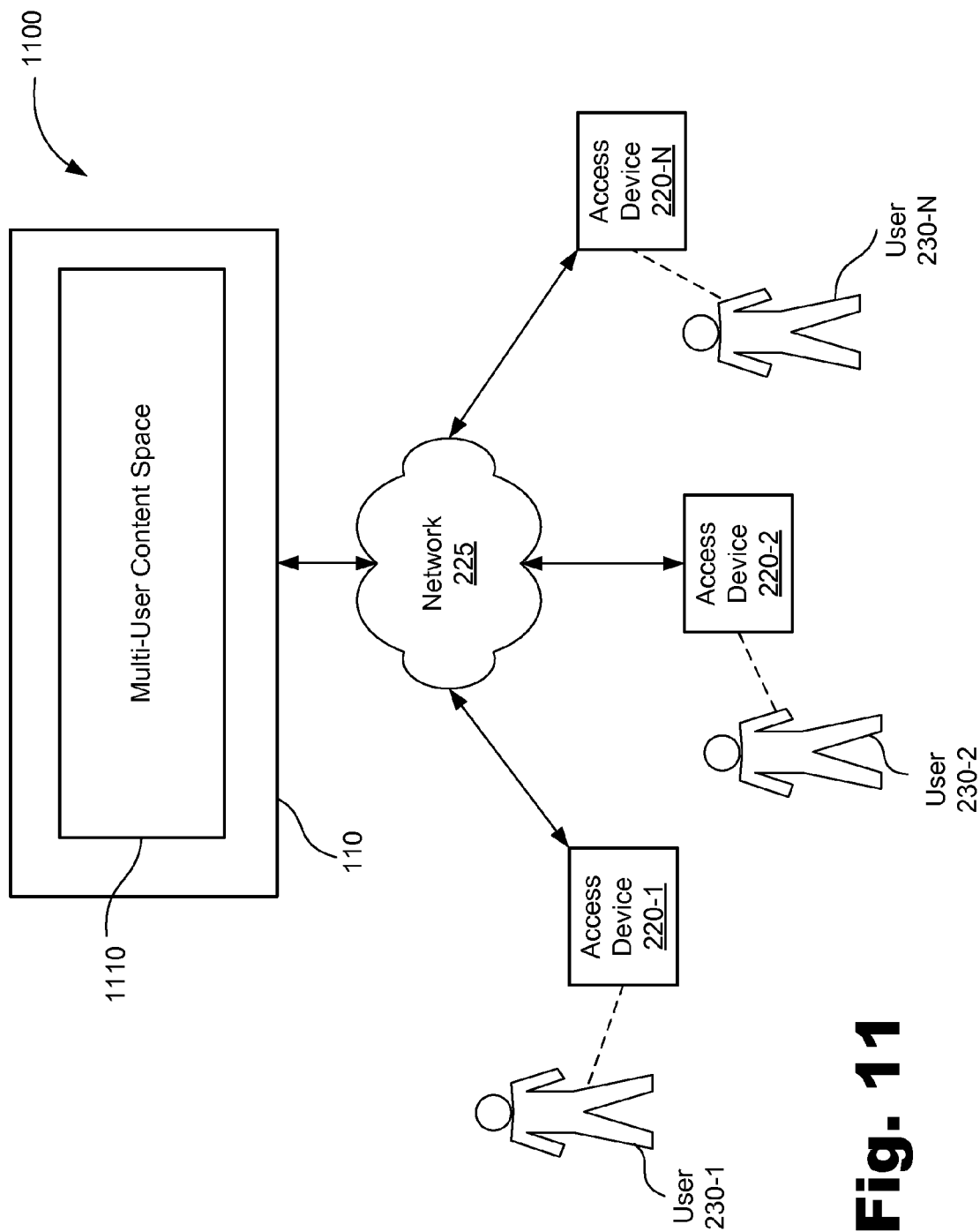
FIG. 11 illustrates another exemplary implementation of the system of FIG. 1 in which a multi-user content space is maintained at the content storage and retrieval subsystem.

FIG. 11 illustrates an exemplary implementation 1100 of system 100 in which multiple users 230-1 through 230-N may be included in a defined group and may utilize multiple access devices 220-1 through 220-N, respectively, to provide, manage, and retrieve content maintained in a multi-user content space 1110 at content storage and retrieval subsystem 110. Access devices 220-1 through 220-N and content storage and retrieval subsystem 110 may be configured to communicate over network 225 in any of the ways described above.

Figure 12:
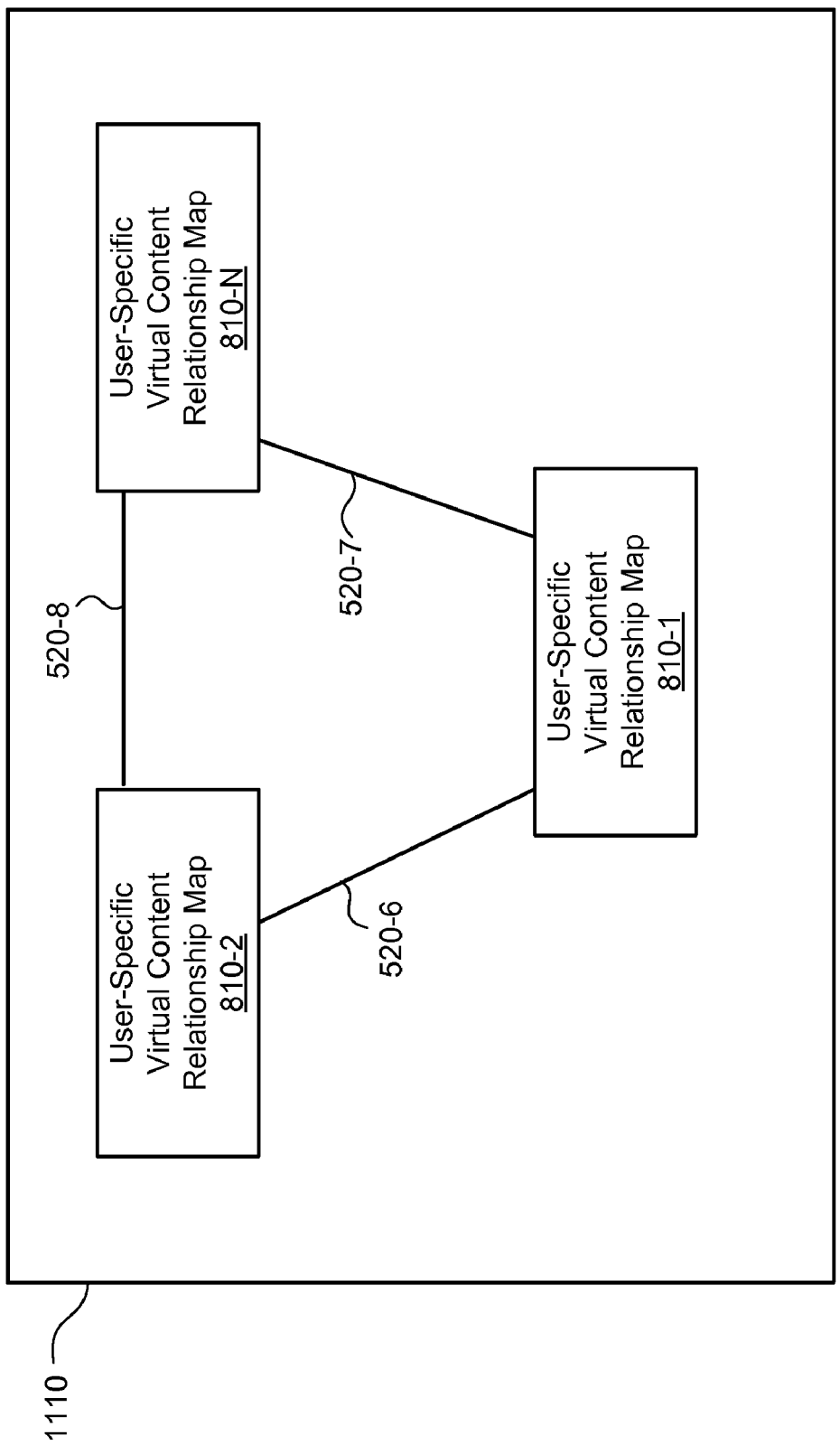
FIG. 12 illustrates an exemplary multi-user content space in the form of a multi-user virtual content relationship map including a plurality of user-specific virtual content relationship maps.

In certain examples, multi-user content space 1110 includes a multi-user virtual content relationship map defining one or more relationships 520 between content instances 510 associated with users 230-1 through 230-N. The relationships 520 may form a virtual map of content instances 510 in any of the ways described above. As an example, FIG. 12 illustrates an exemplary multi-user content space 1110 in the form of a virtual content relationship map including user-specific virtual content relationship maps 810-1, 810-2, and 810-N, and having relationships 520-6, 520-7, and 520-8 connecting the user-specific virtual content relationship maps 810-1, 810-2, and 810-3. In the illustrated example, relationship 520-6 represents a relationship between content in user-specific virtual content relationship map 810-1 and content in user-specific virtual content relationship map 810-2, relationship 520-7 represents a relationship between content in user-specific virtual content relationship map 810-1 and content in user-specific virtual content relationship map 810-N, and relationship 520-8 represents a relationship between content in user-specific virtual content relationship map 810-2 and content in user-specific virtual content relationship map 810-N. While FIG. 12 shows a single relationship 520 between each pairing of user-specific virtual content relationship maps 810-1, 810-2, and 810-N, this is illustrative only. More typically, multiple relationships 520 will interconnect multiple content instances 510 across different user-specific virtual content relationship maps 810.

User-specific virtual content relationship maps 810 may be combined together in any suitable way to form a multi-user virtual content relationship map. For example, one or more relationships between content within different user-specific virtual relationship maps 810 may be identified in accordance with a predefined relationship heuristic as described above and may include or be similar to any of the relationships 520 described above. For example, relationships between content included in different user-specific virtual content relationships maps 810 may include, but are not limited to, location based relationships, time based relationships, content type relationships, content source based relationships, content destination based relationships, and any relationships that may be identified from common or similar content metadata values.

A user (e.g., user 230-1 included in a defined group of users 230-1 through 230-N) may initiate a request for content, such as by using access device 230-1 to send data representative of the request to content storage and retrieval subsystem 110. Content storage and retrieval subsystem 110 may receive the request and identify one or more content instances 510 included in the multi-user content space 1110 (e.g., content instances 510 associated with any of the users 230 included in the group) as being related to the requested content. For example, content storage and retrieval subsystem 110 may identify content instances 510 connected to the requested content by relationships 520, as described above. Content storage and retrieval subsystem 110 may respond to the request by providing data representative of the identified content instances to access device 220-1.

As a specific example, a user 230-1 in a defined group may initiate a request for "Hawaii pictures." All content instances 510 in the group's content space that are related to "Hawaii pictures" may be identified as such, and data representative of the identified content instances 510 may be provided for display to the requesting user 230-1. For example, a list of the identified content instances 510 connected to "Hawaii pictures" by one or more relationships 520 may be provided to access device 220-1 for display.

In certain examples, user 230-1 may wish for system 100 to prioritize the identified content instances 510 such that the user 230-1 may consider "more relevant" content instances 510 before considering "less relevant" content instances 510. As described herein, system 100 may be configured to prioritize content based on user profile relevance.

Figure 13:
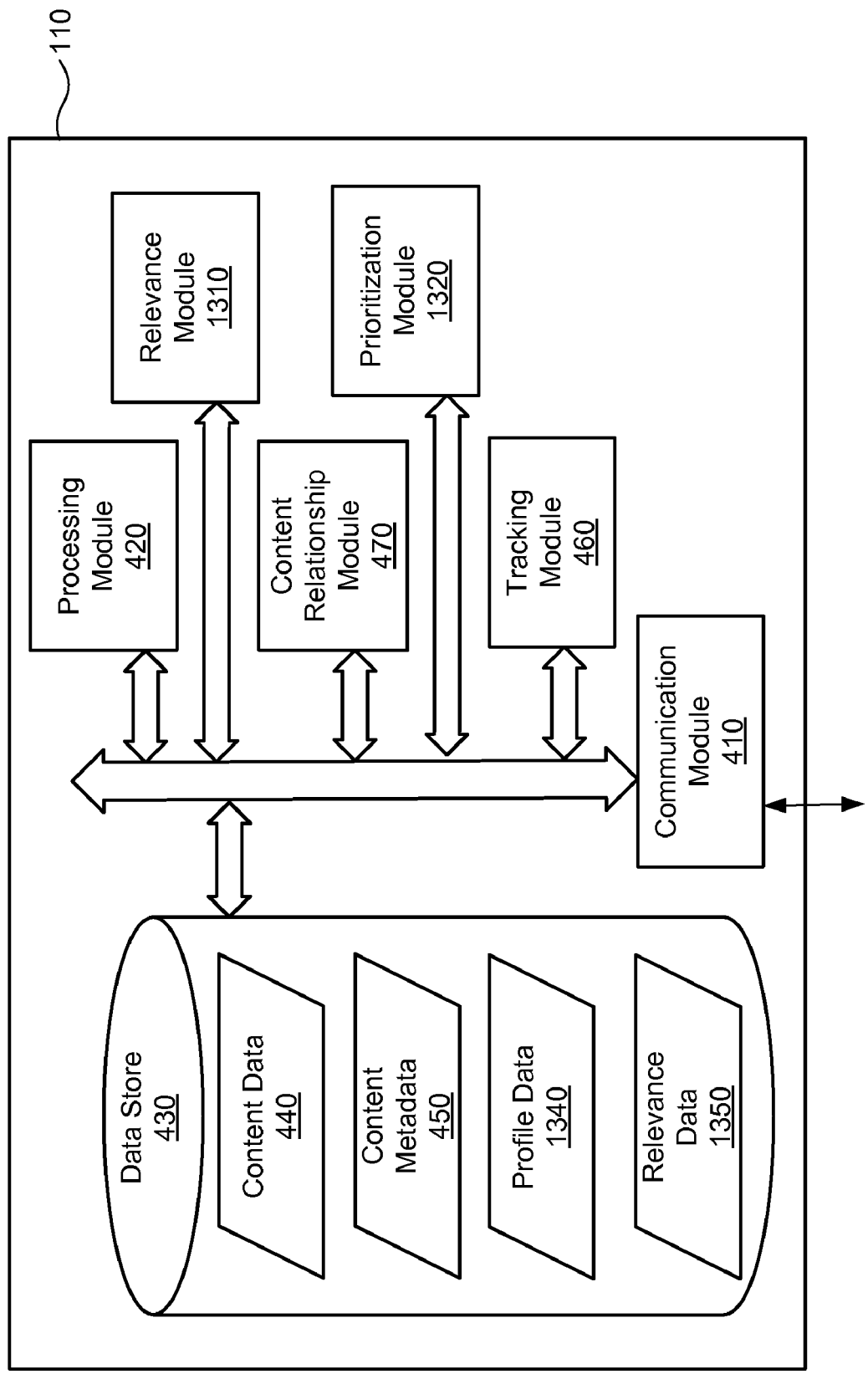
FIG. 13 illustrates an exemplary relevance module and prioritization module included in the content storage and retrieval subsystem of FIG. 4A.

FIG. 13 illustrates a relevance module 1310 and prioritization module 1320 included in content storage and retrieval subsystem 110. Relevance module 1310 and/or prioritization module 1320 may include or be implemented as hardware, computing instructions (e.g., software) tangibly embodied on a computer-readable medium, or a combination of hardware and computing instructions configured to perform one or more of the relevance and/or prioritization processes described herein. In certain embodiments, relevance module 1310 and/or prioritization module 1320 may be implemented as one or more software applications embodied on a computer-readable medium such as data store 430 and configured to direct the processing module 420 to execute one or more of the relevance and/or prioritization operations described herein.

As shown in FIG. 13, data store 430 of content storage and retrieval subsystem 110 may include profile data 1340 and relevance data 1350. Profile data 1340 may include any information associated with user profiles, including any of the user profile information described below. Relevance data 1350 may include any information associated with user profile relevance, including any of the user profile relevance information described below. Relevance module 1310 and/or prioritization module 1320 may store, update, manage, and access profile data 1340 and/or relevance data 1350.

Figure 14:
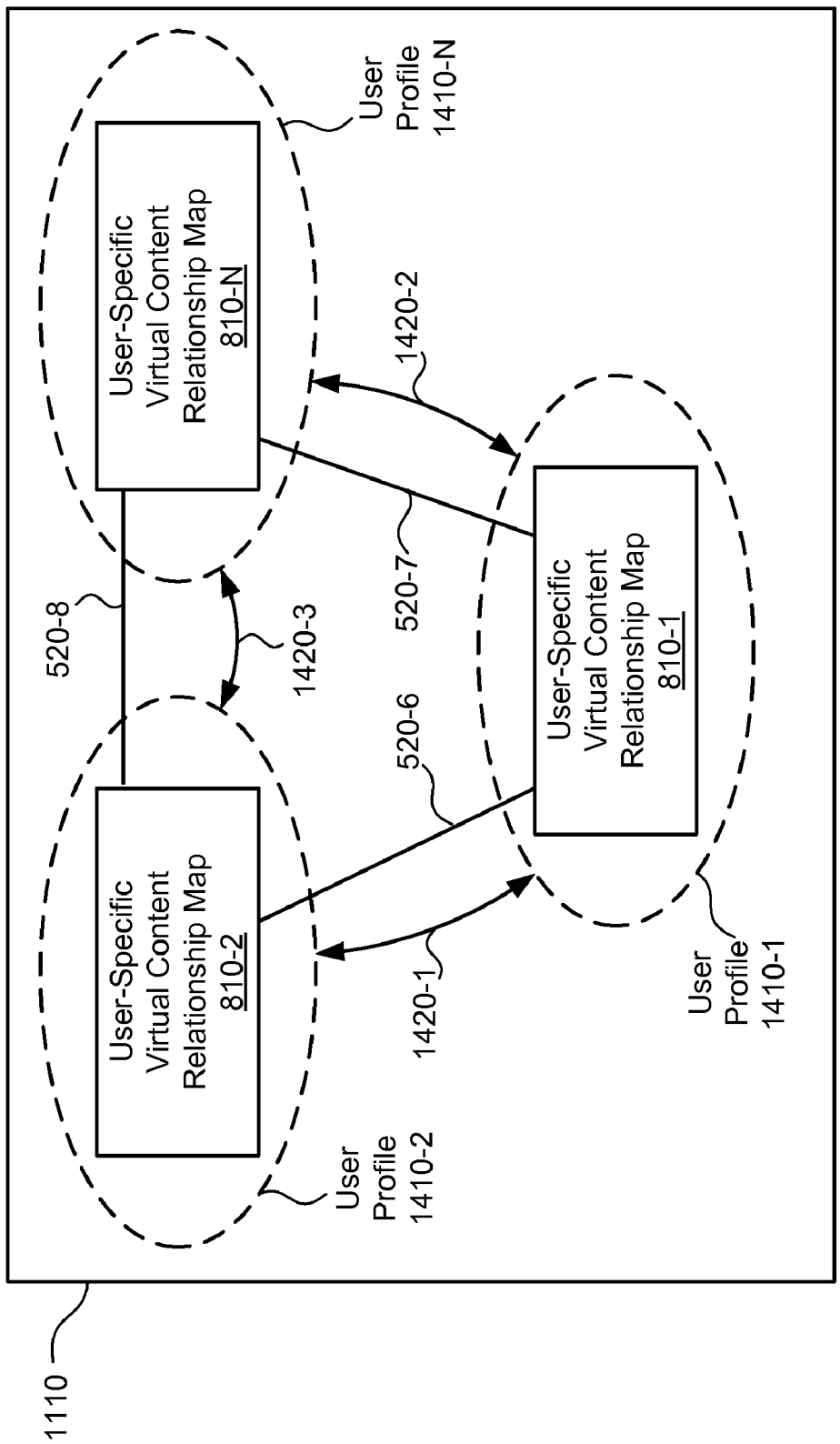
FIG. 14 illustrates exemplary user profiles associated the user-specific virtual content relationship maps of FIG. 12.

To help facilitate an understanding of relevance module 1310 and user profile based relevance processes and operations, FIG. 14 illustrates the multi-user content space 1110 of FIG. 12 and in which the user-specific virtual content relationship maps 810-1 through 810-N are associated with user profiles 1410-1 through 1410-N (collectively "user profiles 1410"), respectively. As shown, each of the user-specific virtual content relationship maps 810 may be associated with one of the user profiles 1410. In the illustrated example, user-specific virtual content relationship map 810-1 is associated with user profile 1410-1, user-specific virtual content relationship map 810-2 is associated with user profile 1410-2, and user-specific virtual content relationship map 810-N is associated with user profile 1410-N.

Each of the user profiles 1410 may be associated with a user 230 of access subsystem 120. For example, user profile 1410-1 may be associated with user 230-1 of access device 220-1, user profile 1410-2 may be associated with user 230-2 of access device 220-2, and user profile 1410-N may be associated with user 230-N of access device 220-N.

User profiles 1410 may include any information descriptive of one or more users 230 who are associated with access subsystem 120 and/or who receive services provided over network 225. User profiles 1410 may include user authentication information, user identifiers, information indicating associations between users 230 and one or more access devices 220, information about access devices 220 that correspond with users 230, user preferences, and/or any other information related to one or more users 230.

In certain embodiments, user profiles 1410 may include information descriptive of commonalities between various user profiles 1410 and/or users 230, including information descriptive of defined user groups and/or shared attributes, preferences, relationships, experiences, communications, interactions, and/or content. Such information may be used to determine relevance (e.g., a relevance score) between user profiles 1410 and may be included in profile data 1340 and/or relevance data 1350.

As used herein, "relevance" between user profiles 1410 refers to a determined measure of relatedness between the user profiles 1410. In FIG. 14, reference number 1420-1 represents a determined relevance between user profiles 1410-1 and 1410-2, reference number 1420-2 represents a determined relevance between user profiles 1410-1 and 1410-N, and reference number 1420-3 represents a determined relevance between user profiles 1410-2 and 1410-3.

Relevance module 1310 may be configured to determine relevance between user profiles 1410 based on a predefined relevance heuristic. The relevance heuristic may be defined by an operator of content storage and retrieval subsystem 110, by a user 230 associated with a user profile 1410, or in any other suitable way. In certain embodiments, the relevance heuristic may be specific to a particular user profile (e.g., user profile 1410-1) and used to determine relevance between that user profile and other user profiles (e.g., 1410-2 and 1410-N). Accordingly, each user profile 1410 may include an individualized and/or customized relevance heuristic specifying how relevance to other user profiles 1410 is determined.

In certain embodiments, a relevance heuristic may be specific to a particular data type (e.g., file type), content type or category (e.g., movies, music, etc.), or other attribute of requested content. Accordingly, relevance between user profiles 1410 may be determined differently for different types or categories of requested content. For example, a first relevance heuristic may be defined and used to determine relevance between user profiles 1410 when requested content is of a particular content category (e.g., movies), and a second relevance heuristic may be defined and used to determine relevance between user profiles 1410 when requested content is of another particular content category (e.g., music). Accordingly, a user profile 1410 may include or otherwise be associated with multiple relevance heuristics that may be selectively used to determine user profile relevance for different categories or types of requested content.

A relevance heuristic may be defined to specify one or more relevance factors and how the one or more relevance factors are processed (e.g., combined) to determine a relevance between user profiles 1410. A relevance factor may include any information, or combination of information, descriptive of one or more commonalities between user profiles 1410. Several exemplary relevance factors and ways of processing relevance factors to determine a relevance score between user profiles 1410 will now be described.

Exemplary relevance factors may include, but are not limited to a commonality factor, a reliance factor, and an interaction factor. A commonality factor may include any measure of shared commonalities between user profiles 1410, including, but not limited to, a number of relationships 520 between content instances 510, a number of specific types of relationships 520 between content instances 510 (e.g., number of topical, time, or location based relationships 520), a number of content instances of a common type or category (e.g., number of MP3 files), a number of content instances associated with a topic (e.g. number of content instances associated with "Hawaii"), any other information indicative of commonalities between user profiles 1410 and/or the users 230 associated with the user profiles 1410, or any combination or sub-combination thereof.

A reliance factor may include any indicator of a measure of reliance to be given to a user profile 1410 and/or user 230 associated with the user profile 1410. Hence, a reliance factor may be used as an indication of reliability of a user 230 associated with a user profile 1410. A reliance factor may include, but is not limited to, an indicator of common interests or experiences shared by users 230 (e.g., information in user profile data 1340 indicates common interests between user profiles), a social status of a user (e.g., a movie critic may be considered a reliable source for movie reviews), an indicator of satisfactory reliance or trust in the past (e.g., a user 230 agreed with a previous movie review provided by another user 230), a relationship between users 230 associated with user profiles 1410 (e.g., "friend," "mother," or "brother"), inclusion of user profiles 1410 in a common defined user group (e.g., a "family," "school," or "work" group), any other information indicative of reliability of a user profile 1410, or any combination or sub-combination thereof.

An interaction factor may include any measure of interaction between user profiles 1410 and/or users 230 associated with user profiles 1410, including, but not limited to, a number of communications between user profiles 1410 or access devices 220 and/or users 230 associated with user profiles 1410 (e.g., a sum of SMS, MMS, email, voice, and/or other communications between access devices 220 associated with user profiles 1410), a frequency of communications (e.g., a number of communications over a certain time period) between user profiles 1410 or access devices 220 and/or users 230 associated with user profiles 1410, a ratio or percentage of overall communications attributable to a user profile 1410, any other information indicative of a measure of interaction between user profiles 1410, or any combination or sub-combination thereof. An interaction factor may be based on overall communications associated with one or more user profiles 1410 or on a subset of communications associated with one or more user profiles 1410, such as communications related to a particular content instance, topic, or content type or category.

Relevance factors, information associated with relevance factors, and/or information useful for determining relevance factors may be obtained in any suitable way. For example, such information may be obtained from content metadata 450, profile data 1340, and/or relevance data 1350. As another example, such information may be tracked and recorded in relevance data 1350. For instance, communications between user profiles 1410 may be monitored, and information descriptive of the communications, such as a sum of communications between user profiles 1410, may be included or updated in relevance data 1350. Content storage and retrieval subsystem 110 may be configured to track such information or to receive information descriptive of such information from another source (e.g., a communications hub device).

Relevance factors may be combined in a predefined way specified in a relevance heuristic to arrive at a relevance score. In certain embodiments, for example, commonality, reliance, and interaction factors may be combined in a weighted fashion to arrive at a relevance score. Hence, an exemplary heuristic for determining a relevance score may include a weighted equation such as Equation 1 shown below, where A, B, and C are predefined constants used to weight relevance factors.

$$\text{Relevance Score} = A(\text{commonality factor}) + B(\text{reliance factor}) + C(\text{interaction factor}) \quad \text{Equation 1}$$

The weight constants, which may be defined by a user 230 associated with a user profile 1410 or by an operator of content storage and retrieval subsystem 110, may be defined to provide more or less consideration to particular relevance factors. Accordingly, a relevance heuristic may be defined to give a desired amount of weight to a particular relevance factor. For example, a user 230 wishing to prioritize content associated with other users 230 with whom user 230 frequently interacts may define a relevance heuristic to be biased toward an interaction factor. This may be accomplished by assigning an appropriate value to weight constant C in Equation 1. Other relevance factors may be similarly weighted as may suit a particular user 230 or implementation. For example, a commonality factor (e.g., number of relationships 520 between content in user profiles 1410) or a reliance factor (e.g., membership of user profiles 1410 in the same group) may be more heavily weighted in other examples.

A relevance heuristic may include one or more equations for determining relevance factor values, such as a value for an interaction factor, for example. Equation 2 below may be used to determine a relevance factor based how communications between a first user profile 1410-1 and another user profile 1410-2 weigh in on the first user profile's overall communications (e.g., what percentage of overall communications associated with user profile 1410-1 are communications with the other user profile 1410-2).

$$\text{Relevance Factor} = (\text{Overall Interaction Frequency}) / (\text{User Profile Interaction Frequency}) \quad \text{Equation 2}$$

The exemplary equations and relevance heuristics described above are illustrative only. Other suitable equations, weights, relevance factors, and relevance heuristics may be used to determine relevance between user profiles in other embodiments as may suit a particular user 230 or implementation.

A user 230 utilizing an access device 220 may access and custom define one or more relevance heuristics that will be used to determine relevance between the user profile 1410 associated with the user 230 and other user profiles 1410 associated with other users 230. Accordingly, a user 230 may define a relevance heuristic as may suit the user 230. For example, a user 230 may choose an amount of consideration that will be given to certain relevance factors. Hence, a definition of relevance and how relevance is determined may be custom defined.

A determined relevance between user profiles 1410 may be used to prioritize content. For example, a plurality of content instances 510 may be prioritized with respect to one another in accordance with determined relevance between user profiles 1410. In certain embodiments, content associated with a user profile 1410-2 having a relatively higher relevance than another user profile 1410-N to user profile 1410-1 may be prioritized ahead of content associated with the other user profile 1410-N.

In some embodiments, content may be prioritized based solely on determined relevance between user profiles 1410. In other embodiments, determined relevance may be one factor used to prioritize content. For example, the determined relevance may be used in combination with one or more other conditions (e.g., a type of relationship 520 between content instances 510 or degree of topical relatedness between content instances) used to prioritize content. For instance, when topical content has a number of matches over a predetermined threshold between user profiles 1410, prioritization of content may be weighted toward a commonality factor rather than toward another factor such as timestamps associated with content.

In certain embodiments, prioritization of content may be used to determine an order in which content is displayed. For example, once a plurality of content instances 510 is prioritized in accordance with a determined relevance between user profiles 1410, data representative of the prioritized content instances 510 may be provided for display such that the data representative of the content instances 510 may be displayed in an order reflective of the prioritization. For instance, a highest prioritized content instance 510 may be displayed first in a list of content instances 510.

To help illustrate prioritization of content based on relevance between user profiles 1410, a specific example of prioritizing and displaying related content in response to a request for content will now be described. A user 230-1 may utilize an access device 220-1 to initiate a request for content (e.g., content associated with a movie). User 230-1 may be associated with user profile 1410-1. Accordingly, the request is associated with user profile 1410-1. Access device 220-1 may transmit data representative of the request over network 225 to content storage and retrieval subsystem 110.

Content storage and retrieval subsystem 110 may receive the request for content and identify a plurality of content instances 510 (e.g., movie reviews and/or other content) as being related to the requested content based on a predefined relationship heuristic, as described above. The identified content instances may be associated with other user profiles. For example, the identified content instances may include a first content instance associated with user profile 1410-2 (e.g., a movie review provided by user 230-2 associated with user profile 1410-2) and a second content instance associated with user profile 1410-N (e.g., a movie review provided by user 230-N associated with user profile 1410-N). In some examples, the first content instance may be included in user-specific virtual content relationship map 810-2 associated with user profile 1410-2 and the second content instance may be included in user-specific virtual content relationship map 810-N associated with user profile 1410-N.

Content storage and retrieval subsystem 110 may determine a relevance (e.g., a relevance score) between the user profile 1410-1 associated with the request and each of the user profiles 1410-2 and 1410-N associated with the identified content instances. In the present example, relevance module 1310 may determine a relevance 1420-1 between user profiles 1410-1 and 1410-2 and a relevance 1420-2 between user profiles 1410-1 and 1410-N. The determination of relevance between the user profiles 1410 may be made in accordance with the predefined relevance heuristic as described above.

Prioritization module 1320 may prioritize the first and second content instances in accordance with the determined relevance between user profiles 1410. For example, if user profile 1410-2 is determined to more relevant than user profile 1410-N to user profile 1410 based on a relevance heuristic, prioritization module 1320 may prioritize the first content instance (e.g., a first movie review) associated with user profile 1410-2 ahead of the second content instance (e.g., a second movie review) associated with user profile 1410-N.

Data representative of the prioritized content instances may be provided in response to the request for content. For example, content storage and retrieval subsystem 110 may transmit data representative of the prioritized content instances to access device 220-1 over network 225. Access device 220-1 may be configured to display data representative of the content instances in accordance with the prioritization. For example, the first content instance may be displayed ahead of the second content instance in GUI 600 based on the prioritization of the content instances based on relevance between user profiles 1410.

In this or similar manner, related content may be prioritized and presented to a requesting user 230-1 in a way that generally prioritizes content based on relevance between user profiles 1410. Accordingly, user profiles 1410 may be leveraged to prioritize content associated with certain users 230 over content associated with other users 230.

Figure 15:
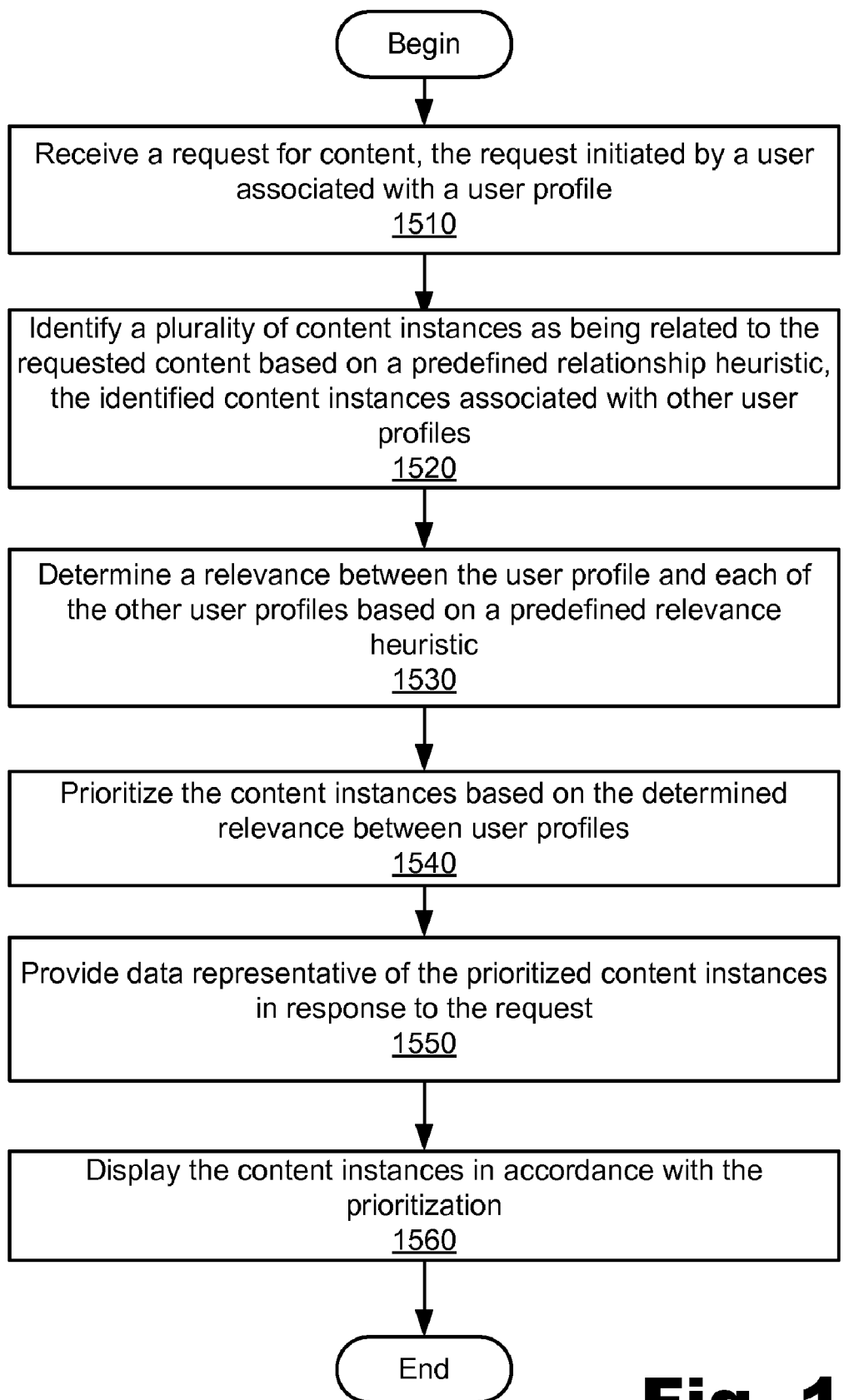
FIG. 15 illustrates an exemplary method of prioritizing content based on user profile relevance.

FIG. 15 illustrates an exemplary method of prioritizing content based on user profile relevance. While FIG. 15 illustrates exemplary steps according to one embodiment, other embodiments may omit, add to, reorder, and/or modify any of the steps shown in FIG. 15.

In step 1510, a request for content is received. The request may be initiated by a user associated with a user profile (e.g., user profile 1410-1). Step 1510 may be performed in any of the ways described above, including content storage and retrieval subsystem 110 receiving data representative of the request over network 225.

In step 1520, a plurality of content instances is identified as being related to the requested content based on a predefined relationship. The identified content instances may be associated with other user profiles (e.g., user profiles 1410-2 and 1410-N). Step 1520 may be performed in any of the ways described above.

In step 1530, a relevance between the first user profile (e.g., user profile 1410-1) and each of the other user profiles (e.g., user profiles 1410-2 and 1410-N) is determined based on a predefined relevance heuristic. Step 1530 may be performed in any of the ways described above, including using the predefined relevance heuristic to determine a relevance score based on one or more relevance factors.

In step 1540, the content instance are prioritized based on the determined relevance between user profiles 1410. Step 1540 may be performed in any of the ways described above.

In step 1550, data representative of the prioritized content instances is provided in response to the request for content. Step 1550 may be performed in any of the ways described above, including transmitting the data over network 225 to an access device associated with the requesting user.

In step 1560, the content instances are displayed in accordance with the prioritization. Step 1560 may be performed in any of the ways described above, including an access device displaying the prioritized content instances in a graphical user interface.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   storing, by a content storage and retrieval subsystem comprising at least one computing device, data representative of a plurality of content instances associated with a plurality of user profiles;
   receiving, by said content storage and retrieval subsystem from an access device associated with a user, a request for a content instance within said plurality of content instances, wherein said user and said content instance are associated with a user profile within said plurality of user profiles;
   identifying, by said content storage and retrieval subsystem, a plurality of other content instances as being related to said content instance based on a predefined relationship heuristic comprising at least one custom relationship condition defined by said user, wherein said other content instances are associated with other user profiles within said plurality of user profiles;
   determining, by said content storage and retrieval subsystem, a relevance between said user profile and each of said other user profiles based on a predefined relevance heuristic;
   prioritizing, by said content storage and retrieval subsystem, said other content instances relative to one another based on said determined relevance; and
   providing, by said content storage and retrieval subsystem in response to said request, data representative of said content instance and said prioritized content instances to said access device.

2. The method of claim 1, further comprising displaying, by said access device, said data representative of said other content instances in accordance with said prioritization.

3. The method of claim 1, wherein said relevance is determined based at least in part on a number of interactions between said user profile and each of said other user profiles.

4. The method of claim 1, wherein said relevance is determined based at least in part on a frequency of interactions between said user profile and each of said other user profiles.

5. The method of claim 1, wherein said relevance is determined based at least in part on said user profile and at least one of said other user profiles being associated with a common user group.

6. The method of claim 1, wherein said relevance is determined based at least in part on a number of relationships between said user profile and each of said other user profiles.

7. The method of claim 1, wherein said relevance is determined based at least in part on an amount of topical content that is common between said user profile and each of said other user profiles.

8. The method of claim 1, wherein said relevance is determined based at least in part on a weighted combination of an interaction factor, a reliance factor, and a commonality factor.

9. The method of claim 1, embodied as computer-executable instructions on at least one non-transitory computer-readable medium.

10. The method of claim 1, wherein said predefined relevance heuristic comprises at least one custom relevance condition defined by said user.

11. A system comprising:
    a data store configured to store content data representative of a plurality of content instances associated with a plurality of user profiles;
    a communication module communicatively coupled to said data store and configured to receive, from an access device associated with a user, data representative of a request for a content instance within said plurality of content instances over a network, wherein said user and said content instance are associated with a user profile within said plurality of user profiles;
    a content relationship module communicatively coupled to said communication module and configured to identify at least two other content instances within said plurality of content instances as being related to said requested content instance based on a predefined relationship heuristic, wherein said identified content instances are associated with at least two other of said user profiles, and wherein said predefined relationship heuristic comprises at least one custom relationship condition defined by said user;
    a relevance module communicatively coupled to said content relationship module and configured to determine a relevance between said user profile and each of said other user profiles based on a predefined relevance heuristic; and
    a prioritization module communicatively coupled to said relevance module and configured to prioritize said identified content instances based on said determined relevance.

12. The system of claim 11, wherein said communication module is further configured to provide data representative of said prioritized content instances to said access device over said network in response to said request and in conjunction with data representative of said requested content instance.

13. The system of claim 12, wherein said access device is configured to display said data representative of said prioritized content instances in accordance with said prioritization.

14. The system of claim 11, wherein said predefined relevance heuristic is specific to said user profile.

15. The system of claim 14, wherein said predefined relevance heuristic comprises at least one custom relevance condition defined by said user.

16. The system of claim 11, wherein said predefined relevance heuristic is specific to a type or category of said requested content.

17. A method comprising:
    storing, by a content storage and retrieval subsystem comprising at least one computing device,
    data representative of a plurality of content instances associated with a user;

receiving, by said content storage and retrieval subsystem from an access device associated with said user, a request for a content instance within said plurality of content instances;

identifying, by said content storage and retrieval subsystem, one or more other content instances within said plurality of content instances as being related to said content instance based on a predefined relationship heuristic comprising at least one custom relationship condition defined by said user;

providing, by said content storage and retrieval subsystem in response to said request, data representative of said content instance and said other content instances to said access device;

identifying, by said content storage and retrieval subsystem, one or more additional content instances within said plurality of content instances as being related to said other content instances based on said predefined relationship heuristic; and providing, by said content storage and retrieval subsystem in response to an interaction by said user with said other content instances, data representative of said additional content instances to said access device.

18. The method of claim 17, further comprising presenting, by said content storage and retrieval subsystem by way of said access device, a graphical user interface configured to enable a customization of said predefined relationship heuristic.

19. The method of claim 17, further comprising receiving, by said content storage and retrieval subsystem by way of said graphical user interface, user input from said user defining said at least one custom relationship condition.

* * * * *